United States Patent
Larsen

(10) Patent No.: US 10,866,013 B2
(45) Date of Patent: Dec. 15, 2020

(54) SOLAR SELECTIVE COATING

(71) Applicant: POLYCSP ApS, Østervrå (DK)

(72) Inventor: Jens William Larsen, Dronninglund (DK)

(73) Assignee: POLYCSP AsP, Østervrå (DK)

( * ) Notice: Subject to any disclaimer, the term of this patent is extended or adjusted under 35 U.S.C. 154(b) by 152 days.

(21) Appl. No.: 16/087,418

(22) PCT Filed: Mar. 3, 2017

(86) PCT No.: PCT/DK2017/050060
§ 371 (c)(1),
(2) Date: Sep. 21, 2018

(87) PCT Pub. No.: WO2017/162247
PCT Pub. Date: Sep. 28, 2017

(65) Prior Publication Data
US 2019/0128566 A1    May 2, 2019

(30) Foreign Application Priority Data
Mar. 22, 2016  (EP) .................................... 16161630

(51) Int. Cl.
F24S 70/20        (2018.01)
F24S 70/25        (2018.01)
(Continued)

(52) U.S. Cl.
CPC ............... F24S 70/20 (2018.05); F24S 10/70 (2018.05); F24S 40/40 (2018.05); F24S 70/25 (2018.05);
(Continued)

(58) Field of Classification Search
None
See application file for complete search history.

(56) References Cited

U.S. PATENT DOCUMENTS

| 5,035,949 A * | 7/1991 | Shepard | C23C 4/02 428/337 |
| 2004/0126594 A1 * | 7/2004 | Rubbia | F24S 70/30 428/446 |

(Continued)

FOREIGN PATENT DOCUMENTS

| CN | 201892340 U | 7/2011 |
| DE | 102012014675 | 2/2013 |

(Continued)

OTHER PUBLICATIONS

International Search Report for International Application No. PCT/DK2017/050060 dated May 17, 2017.
(Continued)

Primary Examiner — David J Laux
(74) Attorney, Agent, or Firm — Dykema Gossett PLLC

(57) ABSTRACT

An exemplary solar selective coating can be provided to be deposited on a substrate. The exemplary solar selective coating can comprise an adhesion layer, an absorber stack comprising at least one absorber layer, and an antireflection stack which can comprise at least one antireflection layer, e.g., all provided in a sandwich configuration. The sandwich configuration can provide the adhesion layer deposited onto the substrate, the absorber stack deposited on the adhesion layer, and the antireflection stack deposited on the absorber stack. The adhesion layer can comprise a metallic layer comprising molybdenum and titanium.

21 Claims, 10 Drawing Sheets

(51) Int. Cl.
*F24S 70/30* (2018.01)
*F24S 40/40* (2018.01)
*F24S 10/70* (2018.01)
*F24S 70/65* (2018.01)
*F24S 80/00* (2018.01)

(52) U.S. Cl.
CPC .............. *F24S 70/30* (2018.05); *F24S 70/65* (2018.05); *F24S 2080/011* (2018.05); *F24S 2080/03* (2018.05); *Y02E 10/40* (2013.01)

(56) References Cited

U.S. PATENT DOCUMENTS

| | | | |
|---|---|---|---|
| 2010/0294263 A1* | 11/2010 | Kuckelkorn | C23C 28/34 126/676 |
| 2011/0088687 A1* | 4/2011 | Kuckelkorn | F24S 70/225 126/677 |
| 2013/0219890 A1* | 8/2013 | Majima | F24S 70/225 60/641.15 |
| 2014/0130794 A1* | 5/2014 | Antonaia | C23C 14/0042 126/676 |
| 2015/0107582 A1 | 4/2015 | Jin et al. | |

FOREIGN PATENT DOCUMENTS

| | | |
|---|---|---|
| DE | 102012112780 | 5/2014 |
| DE | 102013112532 | 5/2015 |
| WO | WO 02/090859 | 11/2002 |

OTHER PUBLICATIONS

International Written Opinion for International Application No. PCT/DK2017/050060 dated May 17, 2017.

* cited by examiner

SOLAR SELECTIVE COATING

CROSS REFERENCE TO RELATED APPLICATION(S)

This application relates to, and claims the benefit and priority from International Patent Application No. PCT/DK2017/050060 filed on Mar. 3, 2017 that published as International Patent Publication No. WO 2017/162247 on Sep. 28, 2017, which claims the benefit and priority from European Patent Application No. 16161630.5 filed on Mar. 22, 2016, the entire disclosures of which are incorporated herein by reference in their entireties.

FIELD OF THE DISCLOSURE

The present disclosure relates to an exemplary solar selective coating to be deposited on a substrate, whereas the exemplary solar selective coating can comprise an adhesion layer, an absorber stack comprising at least one absorber layer, and an antireflection stack comprising at least one antireflection layer in a sandwich construction. The exemplary sandwich construction can be configured with, e.g., the adhesion layer deposited onto the substrate, the absorber stack deposited on the adhesion layer, and the antireflection stack deposited on the absorber stack.

BACKGROUND INFORMATION

Solar energy systems are commercially interesting as solar radiation represents a practically unlimited source of energy and thus represents a huge amount of energy ready to be harvested. The environmental awareness and political initiatives around the globe within renewable energy also acts to increase the interest for solar energy systems.

One method to exploit solar energy is through the use of thermal solar collector systems. Typically, thermal solar collector systems comprise solar absorbers which convert solar radiation into heat through photo-thermal conversion.

Important features for solar absorbers can be high heat conductivity and high infrared reflectance often achieved by solar absorbers comprising metal absorber means constructed with flow channels and coated thin surface layer. The surface layer is generally configured to be spectrally selective absorbing with the aim of absorbing all solar radiation and to avoid loss of absorbed energy as infrared radiation (e.g., heat). The flow channel or channels are configured for fluid to be flown through the absorber means for transferring the absorbed heat to the fluid.

Recently, the solar collector systems can comprise a wide range of collector types from flat-panels to vacuum-protected tubes.

State of the art solar selective coatings with high absorption of solar radiation and low loss of infrared radiation can often be achieved by a multi-layered coating and manufacturing processes utilizing vacuum techniques. One challenge is to produce solar absorbers for thermal solar collector systems typically comprising several-meter-long absorber means to be coated under vacuum conditions.

Another challenge is to achieve state of the art solar selective coatings which optical properties are long-term stable at high temperatures and in atmospheric environment. For solar energy systems, high temperatures refer to temperatures at levels up to 600° C. and for special cases up to 1200° C. Atmospheric environment refers to the fact that the solar absorbers may be used without vacuum or inert gas protection.

Long term use of solar absorbers shows that the substrate surface even when coated with a thin surface layer is subject to corrosion. Furthermore, the solar selective coating may be subject to deterioration and migration from the substrate to the different layers of the coating resulting in changed optical properties of the solar selective coating. Thus, yet another challenge is to increase the long-term stability of the solar absorbers to prolong the lifespan by reducing surface corrosion and deterioration of the optical properties to a few percentage change over a lifespan of up to 25 years when used at high temperatures and in atmospheric conditions.

Typically, solar absorbers installed at CSP (Concentrated Solar Power) plants often comprise collector pipes with solar selective coatings with surrounding vacuum tubes. These familiar vacuum tubes suffer the characteristic problems of lack of robustness and longevity. Surrounding vacuum tubes are also seen from other kinds of absorbers to be installed in other types of solar collectors.

German Patent Application DE 10 2013 112 532 A1 describes a solar absorber comprising an absorber layer system for use in thermal systems. The absorber layer system specifications presented in such document are for temperatures from 100° C. up to 600° C. The absorber layer system comprises one or more layers, where each layer comprises a metal-nitride layer and a half-metal-nitride layer. Due to the nitride-based system of the absorber layer system, a reduced diffusion of nitrogen is achieved which has the effect of increased stability of the solar absorber and thus prolonged lifetime.

A further molybdenum layer or molybdenum bearing layer between the substrate and the absorber layer system are described in such document. The molybdenum layer can function as a diffusion barrier between the substrate and the absorber layer system and/or as a compensation layer to prevent, reduce and/or compensate for different thermal expansion coefficients between the substrate and the absorber layer system. Furthermore, the molybdenum layer can be electrically conductive and function as an infrared reflector so that, for example, less warm radiation can be radiated from the substrate.

German Patent Application DE 10 2013 112 532 A1 describes a metallic layer structure between the sub-strate and the absorber layer system. The metallic layer structure described in that document may function as an adhesion layer, a compensating layer for thermally induced mechanical stresses, a diffusion barrier and/or a reflection layer for heat radiation. The metallic layer structure may comprise multiple layers further comprising absorbing layer(s) between the substrate and the absorber layer system. For the multiple metallic layer structure specific materials are suggested for the thin compensation layer(s) of up to 40 nm thickness: TiNi, Ti, TiN, NiCr TiO2x, TiOx. The use of a metallic layer structure may result in a coating of five or more layers.

However, the more layers comprised in the coating the more complicated becomes both the process and method of making the coating. As German Patent Application DE 10 2013 112 532 A1 provides, the configuration of a layer stack or a layer structure with the desired physical properties can be arbitrarily complex and cannot be predictable, or it can be very difficult to predict.

OBJECT OF THE PRESENT DISCLOSURE

One of the objects of the present disclosure is to overcome one or more of the described shortcomings of the prior art.

SUMMARY OF EXEMPLARY EMBODIMENTS

One such exemplary object of the present disclosure can be achieved by providing an exemplary solar selective coating to be deposited on a substrate according to an exemplary embodiment of the present disclosure. For example, such exemplary solar selective coating can comprise an adhesion layer, an absorber stack comprising at least one absorber layer, and an antireflection stack comprising at least one antireflection layer in a sandwich construction. The exemplary sandwich construction can be configured with, e.g., the adhesion layer deposited onto the substrate, the absorber stack deposited on the adhesion layer, and the antireflection stack deposited on the absorber stack. The exemplary adhesion layer can comprise a metallic layer comprising a refractory metal and a dope-material, whereas the exemplary dope-material can comprise a metal or metalloid and which metallic layer is configured with an amorphous disordered structure.

In an exemplary embodiment of the present disclosure, the adhesion layer can have multiple functions, such as, e.g.:
- High IR reflection—in order to achieve high emission characteristics for the solar selective coating
- High corrosion resistance—so that for example a pinhole or scratch in the upper coating layers will not start corrosion in the adhesion layer and consequently release the solar selective coating in large areas.
- Diffusion barrier at the operational temperature levels—in order to reduce the diffusion of elements from the substrate into the absorber layers and thus to achieve low degradation of optical properties during the lifetime thereby obtaining improved performance of the solar selective coating.
- Good adhesion to the substrate and enabling good adhesion to the first absorber layer.

The refractory metals share properties such as a high melting point above 2000° C., high hardness at room temperature, and they can be chemically inert and have a relatively high density. The refractory metals can be include, e.g., Molybdenum (Mo), Niobium (Nb), Tantalum (Ta), Tungsten (W) and/or Rhenium (Re).

One exemplary effect of this exemplary embodiment is that the dope-material may provide cathodic protection to the metal comprised in the adhesion layer. The refractory metal may hereafter also be referred to as the main metal. The dope-material may be a metal or metalloid, which has high affinity to oxygen, and which has such characteristics that stable and dense oxide layers will be formed in the ranges of potential and pH, where the refractory metal will corrode in the actual application. This can be advantageous in regard to achieving improved corrosion protection and thus a lower corrosion speed.

For a certain level of dope-material, the corrosion rate can relate to the structure of the alloy. In one example, the highest reduction of corrosion rate can be when the alloy is in an amorphous disordered structure, where the elements are distributed completely uniformly and where there are no intermetallic chemical connections/interfaces in a crystallized structure. This may be further advantageous to achieve an improved corrosion protection, and thus, a reduced corrosion speed.

The additional corrosion protection/corrosion control function is important in medium- and high-temperature absorbers (e.g., greater than 80° C.) placed in an atmospheric environment (as opposed to being placed in a vacuum environment), and are especially important when the absorbers are placed in high-corrosion environments, i.e. seaside environments.

Solar selective coating can be defined as, e.g., a coating having high absorption of electromagnetic radiation at the solar spectrum wavelengths and low thermal emittance in the thermal infrared wavelength range defined by its temperature of operation.

The solar selective coating may be defined with a solar selective surface, which is the free surface of the antireflection stack. The free surface is the surface facing the ambient surroundings and opposite to the surface towards the absorber stack.

One effect of this embodiment is that the solar selective coating is configured to be spectrally selective absorbing with high absorption of solar radiation and low loss of absorbed energy as infrared radiation (heat) out through the antireflection stack. This is advantageous in regard to converting solar radiation into heat—sometimes referred to as photo-thermal conversion. The thermal emittance is low to the ambient surroundings but may be high to the substrate.

In one aspect the solar selective coating may be used in ambient surroundings. Thus, the solar selective coating may be a non-vacuum-use solar selective coating but may also be used in protective conditions such as vacuum and inert gas.

An object is achieved by a solar selective coating to be deposited on a substrate, which solar selective coating comprises an adhesion layer, an absorber stack comprising at least one absorber layer, and an antireflection stack comprising at least one antireflection layer in a sandwich construction. The sandwich construction is configured with the adhesion layer deposited onto the substrate, the absorber stack deposited on the adhesion layer, and the antireflection stack deposited on the absorber stack. The adhesion layer comprises a metallic layer comprising molybdenum and titanium.

The adhesion layer may comprise a metallic surface comprising molybdenum (Mo) and titanium (Ti) and/or an alloy thereof. Throughout the description and claims of this specification, the adhesion layer comprising a metallic layer comprising Mo and Ti will also be described by and referred to as a MoTi adhesion layer or MoTi layer regardless of the structure.

The MoTi adhesion layer may be configured as one layer.

In general, molybdenum comprises a number of properties making it useable as adhesion layer or compensation layer in a solar absorber.
- Molybdenum exhibits good properties in terms of adhesion to substrate materials conventionally used in solar absorbers. Good adhesion properties may prevent the absorber stack from loosening from the substrate and thus an advantage of this is an increase in lifetime of the solar selective coating.
- Molybdenum (Mo) has a high reflectivity at wavelengths above 2 µm. This is advantageous in regard to achieving good solar selective properties for the coating as the thermal emittance from the substrate is reduced.
- Molybdenum has reasonably good thermal conductivity properties (Mo: 140 W/(mK)), compared to typical substrates such as carbon steel (CS: 43 W/(mK)) and stainless steel (SS: 16 W/(mK)), which have an impact on the absorber main function of transferring the thermal energy from the solar selective coating to the substrate.

By using Mo or Mo-bearing layers these properties may be used in full.

However, by combining Mo with Ti in one adhesion layer an improved property of corrosion protection is achieved. An effect of the MoTi adhesion layer is that it constitutes a diffusion barrier in relation to the absorber stack. A diffusion barrier or barrier layer inhibits or reduces the movement of material across the barrier or barrier layer.

By adding a small fraction of titanium to the molybdenum layer, the electrochemical potential of the layer will be reduced, thus reducing the relative corrosion potential, resulting in reduced corrosion speed.

Titanium has a high affinity to oxygen. From a Pourbaix diagram for titanium, it may be found that titanium-oxide is formed from a potential level from −1000 mV to 1500 mV in environments of pH levels ranging from 5 to 9. In environments with pH levels above 9, the titanium-oxide can be formed at a potential interval slightly displaced towards lower potentials. In environments with pH levels below 5, the titanium-oxide can be formed at a potential interval slightly displaced towards higher potentials.

Thus, this can facilitate the exemplary process of forming oxidic barrier films in harsh environments, and very important is that the process is a fast reacting process in most environments.

The reduction of corrosion rate relates to the amount of titanium added to the IR layer of molybdenum, however the added titanium also reduces the IR reflector properties of the molybdenum, so a trade-off has to be made between corrosion properties and IR properties of the MoTi adhesion layer. The amount of added Titanium may be determined by experiments where coatings with alternative amounts of added Titanium are tested for IR reflector properties and for corrosion properties by measuring the polarization.

Thus, a MoTi layers has an additional corrosion protection/corrosion-limiting function with respect to a Mo layer, since the titanium provides cathodic protection of the Molybdenum. In this connection it is moreover important that the layer is electrically conductive.

The additional corrosion protection/corrosion control function is important in medium- and high temperature absorbers (e.g., great than 80° C.) placed in an atmospheric environment (as opposed to being placed in a vacuum environment). This may, for example, be important when the absorbers are placed in high-corrosion environments, e.g., seaside environments.

The corrosion protection achieved by the MoTi adhesion layer can be important and/or beneficial for the corrosion resistance of the entire solar selective coating, and can be advantageous for acting as a corrosion protection of the substrate.

Thus, the exemplary effects of the MoTi adhesion layer may be that, e.g.:
  it constitutes a good adhesion or bonding layer for the absorber stack,
  it constitutes a good reflector in relation to IR radiation or thermal emittance from the substrate side,
  it has high reflectivity at wavelengths above 2 μm; and
  it exhibits high corrosion protection/corrosion control function in medium- and high temperature absorbers.

An appropriate exemplary barrier against diffusion of material components between the substrate and the absorber and anti-reflection stacks can be advantageous since the optical properties of the absorber stack and the anti-reflection stack are maintained due to reduced contamination. Furthermore, the deterioration of the solar selective properties may be reduced considerably compared to prior art due to reduced diffusion, thereby maintaining long-term stability of the coating and thus, maintaining the desired properties to prolong the lifespan of the coating.

In general, molybdenum has good corrosion properties. However, the problem of combining a molybdenum adhesion layer with an absorber stack comprising, for example, titanium and aluminium can be that the standard electrochemical potential of molybdenum is much higher than the electrochemical potential of titanium and aluminium. This can cause the molybdenum adhesion layer to act as a cathode for the absorber stack, and increase the corrosion speed of any outside agents.

In general, titanium is characterized by having good corrosion properties, and thus, an effect of the MoTi layer as adhesion layer may be that the MoTi layer is highly resistant to corrosion. This can be important and/or beneficial for the corrosion resistance of the entire solar selective coating, and can be advantageous in regard to acting as a corrosion protection of the substrate.

For example, the combination of the above-mentioned effect can be advantageous to achieve an adhesion layer which serves a as a good reflector, a corrosion-resistant layer and a diffusion barrier with excellent adhesion properties. These exemplary features can be important in harsh environmental surroundings, and/or when operated at high temperatures.

The adhesion layer of the solar selective coating can thus also act as an IR-reflector layer and a diffusion barrier.

Furthermore, using the MoTi layer as adhesion layer can achieve that, e.g., a single adhesion layer may be used for achieving the above-described advantages.

In one exemplary embodiment of the present disclosure, the MoTi adhesion layer can contain a small contribution of silicon (Si), Yttrium (Y) and/or niobium (No). The effect of adding these materials to the MoTi adhesion layer may be to modify the larger MoTi structures with the advantage of obtaining a similar or increased corrosion resistance and with the additional effect of obtaining a similar or increased long-term stability of the optical properties of the solar selective coating.

In general, the thickness of the individual layers may be up to 5000 nm. However, the benefit of increasing the layer thickness should be considered in comparison with the cost of the materials.

In one exemplary embodiment of the solar selective coating according to the present disclosure, the adhesion layer can have an adhesion layer thickness in the range 30 nm to 500 nm, preferably in the range 80-200 nm, even more preferably in the range 110-130 nm.

A further effect of this exemplary embodiment can be that a sufficient thickness of the adhesion layer is achieved for covering the substrate and to achieve the abovementioned effects of the adhesion layer with the advantages also described above. A further advantage can be that excessive costs to adhesion layer materials are prevented.

In one exemplary embodiment of the solar selective coating according to the present disclosure, the adhesion layer can comprise a metallic layer comprising 85-99% (w/w) Mo and 1-15% (w/w) Ti. Preferably, e.g., the metallic layer comprises in the rage 90-97% (w/w) Mo and 3-10% (w/w) Ti. Even more preferably, e.g., the metallic layer comprises in the rage 95-96% (w/w) Mo and 4-5% (w/w) Ti.

A further effect of this exemplary embodiment can be that a sufficient amount of Ti may be added to the MoTi metallic composition to achieve improved corrosion-resistant properties caused by titanium with the advantages, as previously mentioned, of improved corrosion resistance of the entire solar selective coating in regard to acting as a corrosion protection of the substrate.

In one exemplary embodiment according to the present disclosure, the absorber layer(s) comprise(s) a ceramic and/or metallic com-position comprising elements selected from the group consisting of: aluminium, nitrogen, titanium, oxygen or combinations hereof.

The absorber layer may comprise ceramic and/or metallic materials comprising both ceramic compositions and ceramic metallic CERMET compounds.

Such absorber layers are characterized by being high temperature stable, having high oxidation resistance and good absorption properties for wavelengths below 2.5 μm.

These absorber layers may comprise, e.g., titanium aluminium nitride or titanium aluminium oxynitride. The compositions of the examples will throughout the description and claims be described by and referred to by the above notations and may include for example TiAlN, TiAlNO, TiN but again not limited to these examples.

In one exemplary embodiment according to the present disclosure, the antireflection layer(s) comprise(s) a ceramic composition comprising elements selected from the group consisting of: silicon nitride(s), silicon oxide(s), aluminium nitride(s), aluminium oxide(s), titanium oxide(s) or combinations hereof.

The compositions throughout the description and/or claims are also described by and referred to by the above notations, and may include for example Si3N4, SiO, SiO2, Al2O3, AlN, TiO, TiO2, but certainly not limited to these examples.

The antireflection layer may comprise other ceramic compositions than those mentioned above. Alternatively, the antireflection layer may comprise inorganic compositions with a refractive index below 2.

Such antireflection layers can be characterized by having a high transmission for wave-length below 2.5 μm and also being highly resistant towards oxidation and humidity and corrosion-resistant.

In addition, a further effect of the above-described exemplary embodiments with the described absorber layers in combination with the antireflective layers may have optical properties resulting in high optical absorption. This is advantageous in regard to increasing the energy yield of the solar selective coating.

In one exemplary embodiment of the solar selective coating according to the present disclosure, the layer thickness of the individual layers comprised in the solar selective coating is selected from a group of solutions obtained from calculation of reflectance and absorption using a matrix formalism algorithm. The matrix formalism algorithm and/or procedure can be based on boundary conditions and based on input of the reflective indices of individual layer materials and the sequence of the individual layers. The solutions have an optical absorption >80% of the spectrum Solar insolation AM 1.5 and an emittance <30% at a temperature of 350° C.

A further effect of this exemplary embodiment can be that a variety of multi-layered solar selective coatings may be theoretically estimated in regard to reflectance and emittance and with the additional effect of providing a solution of layer thicknesses depending on the reflectance and emittance to be achieved. Additionally, a high corrosion resistance of the entire solar selective coating can be achieved, which can be advantageous in regard to acting as a corrosion protection of the substrate. This can be advantageous both for reducing research and development time, and to reduce costs of materials and reduced use of production facilities.

This exemplary embodiment can also facilitate estimating for the use of materials which may not be at hand in the production and thus saving time and costs for providing materials which may turn out as useless.

The material input may be based on knowledge of the materials such as for example optical properties, physically and chemically binding properties between the materials of the individual layers, the layer forming properties, possible deposition methods, corrosion properties, or diffusion properties. The examples are not comprehensive, and other material properties may be important for the specific use of the solar selective coating. However, the benefits of the embodiment may be appreciated by a skilled person with a material knowledge sufficient for providing knowledge-based input for practically useable outputs.

In one exemplary embodiment of the present disclosure, the solar selective coating comprises a three-layer sandwich structure, wherein the adhesion layer comprises a 110-130 nm thick adhesion layer comprising a metallic layer comprising 85-99% (w/w) Mo and 1-15% (w/w) Ti, preferably in the rage 90-97% (w/w) Mo and 3-10% (w/w) Ti, even more preferably in the rage 95-96% (w/w) Mo and 4-5% (w/w) Ti. The absorber stack is configured with one absorber layer comprising a 110-130 nm titanium aluminium nitride layer, and wherein the antireflection stack is configured with one antireflection layer comprising a 50-70 nm silicon nitride(s) layer.

The exemplary described thicknesses can be a preferred layer thicknesses for this exemplary embodiment. In another aspect of the exemplary embodiments of the present disclosure, a preferred range of the layer thicknesses may include, but not limited to, the following broader exemplary ranges:

MoTi adhesion layer thickness range: 60 nm to 200 nm
titanium aluminium nitride absorber layer thickness range: 40 nm to 150 nm
silicon nitride(s) antireflection layer thickness range: 30 nm to 100 nm In one exemplary embodiment according to the present disclosure, the solar selective coating can comprise a four-layer sandwich structure. The adhesion layer can comprise a 110-130 nm thick, the adhesion layer comprising, e.g., a metallic layer comprising 95% Mo (w/w) and 5% Ti (w/w). The exemplary absorber stack can be configured with one absorber layer comprising a 60-80 nm titanium aluminium nitride layer and one semi-absorber layer comprising a 20-40 nm titanium aluminium oxynitride layer, and the exemplary antireflection stack can be configured with one antireflection layer comprising a 70-90 nm silicon oxide(s) layer.

The described thicknesses can be the preferred layer thicknesses for this exemplary embodiment. In another aspect of the exemplary embodiment, a preferred range of the layer thicknesses may include, but not limited to, the following exemplary broader ranges:

MoTi adhesion layer thickness range: 60 nm to 200 nm
titanium aluminium nitride absorber layer thickness range: 30 nm to 120 nm
titanium aluminium oxynitride semi-absorber layer thickness range: 10 nm to 70 nm
silicon oxide(s) antireflection layer thickness range: 50 nm to 100 nm An effect of this exemplary embodiment is clearly seen from the accelerated corrosion measurements shown in FIG. 4. The tests show a significant improvement in regard to decreased corrosion rate of the test samples deposited with the four-layer solar selective coating. This may be advantageous in regard to improved lifetime of the coating, improved corrosion protection of a substrate and improved quality of the coating throughout the lifetime.

A further effect of the exemplary embodiment of the present disclosure can be seen from the calculated reflectance spectrum shown in FIG. 5. The calculated reflectance versus wavelength shows that reflec-tance is low when the *Solar insolation AM*1.5 spectrum is high. This gives the ad-vantage of a high absorption level of 96% of the solar insolation.

The exemplary embodiment of the three-layer solar selective coating can show similar effects of increased corrosion resistance and absorption levels of 93%, and thus with the same advantages. The resulting exemplary effect of layers of the stack having thicknesses within these ranges may be an acceptable absorption up to 93%, and an emittance down to 10% at 350° C.

The exemplary three-layer solar selective coating may reduce the costs and time of production due to only comprising three-layers compared to the four-layer coating. Nonetheless, the four-layer coating can return a higher calculated absorption level. This illustrates how several solar selective coatings may be applicable and that the solar selective coating may be chosen in consideration of production cost, yield, application, lifetime or other features.

An exemplary object of the exemplary embodiments of the present disclosure can be achieved by providing a solar selective coating to be deposited on a substrate, whereas the exemplary solar selective coating can comprise an adhesion layer, an absorber stack comprising at least one absorber layer, and an antireflection stack comprising at least one antireflection layer in a sandwich construction. The sandwich construction can be configured with the adhesion layer deposited onto the substrate, the absorber stack deposited on the adhesion layer, and the antireflection stack deposited on the absorber stack. The exemplary adhesion layer can comprise metallic layer comprising Mo and Ti, and the substrate surface can be configured with a pre-polished surface, whereas the substrate can comprise high temperature stable metallic alloys.

As indicated herein, the exemplary effects of the MoTi adhesion layer may be that:
  it constitutes a good adhesion or bonding layer for the absorber stack,
  it constitutes a good reflector in relation to IR radiation or thermal emittance from the substrate side,
  it has high reflectivity at wavelengths above 2 µm; and
  it exhibits high corrosion protection/corrosion control function in medium- and high temperature absorbers.

The exemplary corrosion protection achieved by the MoTi adhesion layer can be important for the corrosion resistance of the entire solar selective coating, and may be advantageous in regard to acting as a corrosion protection of the substrate.

High temperature stable metallic alloys may, for example, be stainless steel, steel, aluminium, bronze, kovar, conifer or fernico. However, these alloys are only examples and the substrate may comprise other similar high temperature stable metallic alloys. The high temperature stable metallic alloys may be selected from alloys comprising metals selected from the group consisting of: iron (Fe), copper (Cu), aluminium (Al), molybdenum (Mo), nickel (Ni), chromium (Cr), cobolt (Co) or combinations hereof.

A further exemplary effect of using high temperature stable metallic alloys for the substrate may enhance the temperature stability of the solar selective coating deposited on the substrate due to reduced thermal induced deformation of the substrate during use. Furthermore, the combined solution of a high temperature stable substrate and the solar selective coating may be more temperature stable due to a low level of material transformation and diffusion. This may be advantageous in regard to the fact that the adhesion is less challenged compared to substrates with large thermal expansion coefficients and thus, in regard to improved lifetime of the coating, improved protection of a substrate and improved quality of the coating throughout the lifetime.

In one exemplary embodiment, the substrate can comprise a thermal absorber configuration.

The exemplary thermal absorber configuration may comprise, but not limited to, a spherical thermal absorber configuration, a cylindrical thermal absorber configuration, or a planar thermal absorber configuration, e.g., comprising a flat thermal absorber configuration or a pressure formed thermal absorber configuration.

The cylindrical and spherical thermal absorber configuration may be or include pipes or tubes with different cross-sectional geometries, such as oval, square, rectangular or combinations thereof. Exemplary variants of the planar thermal absorber configuration may be or include flat plates, curved plates, wrinkled plates, plates with reprints in the surface, or combinations thereof. The geometry of the thermal absorber configuration can include, but certainly not limited to, the abovementioned geometries. Furthermore, the exemplary thermal absorber configuration may be joined or combined in numerous ways.

The thermal absorber configuration can be used for heat transfer from the substrate and conse-quently from the solar selective coating. The heat transfer may be aided by a fluid flow in the absorber configuration with heat transfer from the substrate to the fluid. The efficiency of heat transfer depends on the fluid and the contact from the substrate to the fluid. The exemplary advantages of an effective heat transfer may be an increased heat energy yield. Furthermore, an effective heat transfer may result in improved lifetime due to the fact that overheating or prolonged use at high temperatures is avoided.

The surface topography of the thermal absorbers may be chosen according to the use. For example, micro surface roughness being sharp micro edges should be considered in regard to the adhesion and characteristics of the coating. This may be derived from the measurements in FIG. 4, whereas a micro surface roughness related to sharp micro edges of the substrate surface topography may decrease the corrosion resistance.

The rate of thermal transfer can depend on the interface of the fluid and the substrate and the heat transfer coefficient of both the substrate and the fluid.

An increase in thermal transmission rate may be achieved by a direct contact between the fluid and the material comprising the substrate onto which the selective coating is deposited. Furthermore, an increase in thermal transmission rate may be achieved by an increased contact surface of the fluid to the substrate.

Examples of the thermal absorber configuration with a high thermal transmittance may be double walled tube thermal absorber means, embossed or pressure formed thermal absorber means deposited with a solar selective coating on the surface.

The type of thermal absorber to be used depends on the application. For example, the double walled tube thermal absorber may be applicable in CSP plants using parabolic trough for concentrating the solar insolation onto a tube formed solar absorber.

In general, for certain applications, a high level of heat transmission from the coating through the material of the thermal absorber configuration can be provided to the fluid. A high heat transmission level can be obtained through a direct contact from the part of the absorber means coated with the solar selective coating and the fluid and by increasing the contact area of fluid with the part of the absorber configuration coated with the solar selective coating. A further effect of this exemplary embodiment can be that the energy from solar insolation is converted to thermal energy contained by the fluid to be converted to a given useful energy form through a generator. The exemplary advantage of a high level of heat transmission may be an increased yield in the energy production and avoiding overheating the solar absorber for prolonged lifetime.

The exemplary pressure-formed thermal absorber configuration, which can also be referred to as pillow-plate absorbers, may be a thermal absorber panel configured with at least one flow channel with a flow channel first end and a flow channel second end, at least one inlet connected to a flow channel first end and at least one outlet connected to a flow channel second end. The thermal absorber panel can comprise at least two joinable sheets joined by high pressure joints which sheets are configured with a top side and a bottom side and placed flat on top of each other with a first sheets bottom side facing a second sheets top side and with a bottom outer sheet and a top outer sheet which bottom outer sheet and top outer sheet panel is joined in a closed loop encircling the inlet(s) and outlet(s). The two or more sheets comprising the thermal absorber panel may be further joined together by high pressure joints in a pattern to form one or more channels from inlet to outlet, where at least one flow channel is a pressure expanded flow channel. The absorber panel is pressure formed by applying a high pressure to the inlet(s) and or outlet(s).

High pressure joints may be referred to as, e.g., joints with strength high enough to with-stand the pressure arising during the pressure expansion of the flow channel. High pressure joins may also be referred to as, e.g., joints with strength withstanding the stress and/or strain arising in the construction, and thus, the strength comparable to that of the sheets.

In one exemplary embodiment of the present disclosure, the substrate can comprise pressure formed thermal absorber means configured with a thermal absorber panel comprising at least two joinable sheets joined by high pressure joints and configured with at least one flow channel, at least one inlet, and at least one outlet where at least one flow channel is a pressure expanded flow channel.

The effects and advantages of this exemplary embodiment can be similar as those previously described. A further effect of this exemplary embodiment can be that the solar selective coating may be added before or after pressure expanding the flow channel(s) but after joining the sheets. This can be advantageous for obtaining an intact solar selective coating on the surface, and thus taking advantage of the corrosion protection achieved by the MoTi adhesion layer which is essential for the corrosion resistance of the entire solar selective coating.

For example, if the sheets are joined by welding, the heat from the welding process may cause damage to the solar selective coating if the welding is performed after deposition of the coating.

One of the objects of the present disclosure may be achieved by an exemplary method for selecting a solar selective coating, whereas the layer thickness of individual layers of the solar selective coating are selected from a group of solutions obtained from calculation of reflectance and absorption using a matrix formalism algorithm. The matrix formalism algorithm and/or procedure can be based on boundary conditions and based on input of the reflective indices of individual layer materials and the sequence of the individual layers. The solutions have an optical absorption >80% of the spectrum Solar insolation AM 1.5 and an emittance <30% at a temperature of 350° C.

As previously described, a further effect of this exemplary embodiment can be that a variety of multi-layered solar selective coatings may be theoretically estimated in regard to reflectance and emittance and with the additional effect of providing a solution of layer thicknesses depending on the reflectance and emittance to be achieved. Such exemplary embodiment can still achieve a high corrosion resistance of the entire solar selective coating which is advantageous in regard to acting as a corrosion protection of the substrate. This can be advantageous both in regard to reduced research and development time but also in regard to reduced costs of materials and reduced use of production facilities.

This exemplary embodiment also provides for estimating the possible use of materials which may not be at hand in the production and is thus saving time and costs for providing materials which may turn out as useless.

The material input may be based on knowledge of the materials such as for example optical properties, physically and chemically binding properties between the materials of the individual layers, the layer forming properties, possible deposition methods, corrosion properties, or diffusion properties. The examples are not comprehensive and other material properties may be important for the specific use of the solar selective coating. The exemplary benefits of the exemplary embodiment may be appreciated by a skilled person with a material knowledge sufficient for providing knowledge-based input for practically useable outputs.

Another exemplary object of the present disclosure may be achieved by a method for making a solar selective coating by a vacuum deposition process (VDP) comprising the acts of providing a pre-polished substrate, depositing an adhesion layer onto the pre-polished substrate, depositing an absorber stack onto the adhesion layer one layer at a time, and depositing an antireflection stack onto the absorber stack one layer at a time. The exemplary adhesion layer can comprise a metallic layer comprising a refractory metal and a dope-material, whereas the dope-material can comprise a metal or metalloid and which metallic layer is configured with an amorphous disordered structure.

The dope-material may be a metal or metalloid, which has high affinity to oxygen, and which has such characteristics that stable and dense oxide layers will be formed in the ranges of potential and pH, where the refractory metal will corrode in the actual application. This may be advantageous for achieving improved corrosion protection and thus reduced corrosion speed.

The adhesion layer may be deposited using one target for the dope-material and one target for the refractory metal, or using one target comprising both materials in the right molar or weight combination.

The vacuum deposition process may, for example, be selected from the group consisting of: physical vapor deposition (PVD), reactive magnetron sputtering, chemical vapor deposition (CVD), plasma enhanced chemical vapor deposition (PECVD), electron beam deposition and cathodic arc evaporation. Furthermore, the sputtering deposition may for example be performed using pulsed DC sputtering, HIPIMS (High Power Impulse Magnetron Sputtering) or RF sputtering. However, the vacuum deposition process is not limited to these examples just as the sputtering deposition may be performed using other techniques.

The further exemplary effects and advantages of this exemplary embodiment may be in line with those al-ready pointed out and previously described including the following effects:

The solar selective coating is configured to be spectrally selective absorbing with high absorption of solar radiation and low loss of absorbed energy as infrared radiation (heat).

The adhesion layer constitutes a good reflector in relation to IR radiation or thermal emittance from the substrate side.

The adhesion layer constitutes a good adhesion or bonding layer for the absorber stack.

The adhesion layer constitutes a diffusion barrier in relation to the absorber stack.

The adhesion layer is highly resistant to corrosion.

In general, the advantages may be improved lifetime of the coating, improved protection of the substrate and improved quality of the coating throughout the lifetime.

As previously stated, an exemplary effect of the adhesion layer may exhibit high corrosion protection/corrosion control function in medium- and high temperature absorbers. And thus, the corrosion protection achieved by the adhesion layer may be important for the corrosion resistance of the entire solar selective coating and is advantageous in regard to acting as a corrosion protection of the substrate.

Yet another exemplary object of the present disclosure may be achieved by a method for making a solar selective coating by a vacuum deposition process (VDP) comprising the acts of providing a pre-polished substrate, depositing an adhesion layer onto the pre-polished substrate, depositing an absorber stack onto the adhesion layer one layer at a time, and depositing an antireflection stack onto the absorber stack one layer at a time. The adhesion layer can comprise a metallic layer comprising Mo and Ti.

The MoTi layer may be deposited using one molybdenum and one titanium target or using one target comprising both molybdenum and titanium in the right molar or weight combination.

The vacuum deposition process may, for example, be selected from the group consisting of: physical vapor deposition (PVD), reactive magnetron sputtering, chemical vapor deposition (CVD), plasma enhanced chemical vapor deposition (PECVD), electron beam deposition and cathodic arc evaporation. Furthermore, the sputtering deposition may, for example, be performed using pulsed DC sputtering, HIPIMS (High Power Impulse Magnetron Sputtering) or RF sputtering. However, the vacuum deposition process is not limited to these examples, and likewise the sputtering deposition may be performed using other exemplary techniques.

The further exemplary effects and advantages of this exemplary embodiment may be in line with those already pointed out and previously described including the following effects:

The solar selective coating is configured to be spectrally selective absorbing with high absorption of solar radiation and low loss of absorbed energy as infrared radiation (heat).

The MoTi layer as adhesion layer is that it constitutes a good reflector in relation to IR radiation or thermal emittance from the substrate side.

The MoTi layer as adhesion layer may be that it constitutes a good adhesion or bonding layer for the absorber stack.

The MoTi layer as adhesion layer is that it constitutes a diffusion barrier in relation to absorber stack.

The MoTi layer is highly resistant to corrosion.

In general, the advantages may be improved lifetime of the coating, improved protection of the substrate and improved quality of the coating throughout the lifetime.

As previously stated, an effect of the MoTi adhesion may be that the MoTi layer exhibits high corrosion protection/corrosion control function in medium- and high temperature absorbers. Thus, the corrosion protection achieved by the MoTi adhesion layer can be important for the corrosion resistance of the entire solar selective coating and is advantageous in regard to acting as a corrosion protection of the substrate.

Still a further exemplary embodiment of the present disclosure may be achieved by a method for depositing a solar selective coating comprising a further act of preparing the pre-polished substrate surface before depositing the adhesion layer by ion-etching.

A further exemplary effect of this aspect is that surface preparation which reduces the sharp micro surface roughness of the substrate and smoothes the substrate surface shows, in a surprising extent, a significant improvement of the corrosion properties, which again may be advantageous in regard to improved lifetime of the coating, improved protection of the substrate and improved quality of the coating throughout the lifetime.

Still a further exemplary object of the present disclosure may be achieved by a method for making a solar selective coating wherein the adhesion layer is deposited onto the substrate comprising the following acts:

providing a base pressure of <1E-4 mbar;

providing a substrate temperature above 50° C., preferably above 100° C., even more preferably above 150° C.;

providing a process pressure of <1E-1 mbar by providing a protective atmosphere to the process chamber of instrument grade argon gas prior to deposition of the adhesion layer by a vacuum deposition process; and performing the vacuum deposition process.

Another object of the present disclosure may be achieved by a method for making a solar selective coating wherein the absorber stack is deposited onto the adhesion layer comprising the following acts:

providing a base pressure of <1E-4 mbar;

providing a substrate temperature (200) above 50° C., preferably above 100° C., even more preferably above 150° C.;

providing a process pressure <1E-1 mbar by providing a protective atmosphere to the process chamber of instrument grade argon gas prior to deposition of the adhesion layer by a vacuum deposition process; and performing the deposition process using at least one reactive gas selected from the group consisting of: instrument grade oxygen, instrument grade nitrogen and using a partial pressure of the reactive gas(es) of 1E-6 to 5E-4 mbar, preferably in the range 5E-6 to 1E-4 mbar, even more preferably in the range 1E-5 to 5E-5 mbar.

A further exemplary object of the present disclosure may be achieved by a method for making a solar selective coating wherein the anti-reflection stack is deposited onto the absorber stack comprising the following acts:

providing a base pressure of <1E-4 mbar;

providing a substrate temperature above 50° C., preferably above 100° C., even more preferably above 150° C.;

providing a process pressure <1E-1 mbar by providing a protective atmosphere to the process chamber of instrument grade argon gas prior to deposition of the adhesion layer by a vacuum deposition process; and performing the deposition process using at least one reactive gas selected from the group consisting of: instrument grade oxygen, instrument grade nitrogen and using a partial pressure of the reactive gas(es) of 1E-6 to 5E-4 mbar, preferably in the range 5E-6 to 1E-4 mbar, even more preferably in the range 1E-5 to 5E-5 mbar.

The base pressure is the pressure provided in the vacuum chamber prior to the deposition processes.

The substrate temperature at deposition of the individual layers may also be referred to as deposition temperature and is provided to be in the range 50° C. to 500° C., preferably in the rage 100° C. to 300° C., even more preferably in the range 140° C. to 180° C.

One exemplary effect of depositing the elements simultaneously at relatively low temperatures in the range of 100° C. to 300° C. by PVD sputtering processes may be that an amorphous disordered structure, in literature also described as atomic disorder coatings, is established.

This may be advantageous for a certain level of titanium "dope", the corrosion rate relates to the structure of the alloy. The highest reduction of corrosion rate is when the alloy is in an amorphous disordered structure, where the elements are distributed completely uniformly and where there are no intermetallic chemical connections/interfaces in a crystallized structure.

This increased robustness against corrosion related to the atomic disorder, can operate as long as the alloy of MoTi is not brought to higher temperature levels where the disordered structures are reduced by diffusion processes. Diffusion processes can bring intermetallic compounds with Mo in particles of pure Mo, and such a crystalline structure of the MoTi layer has reduced robustness against corrosion.

Existing solar selective coatings often require several processes, one for each layer or stack comprised in the solar selective coating.

The exemplary embodiments described herein for depositing the adhesion layer, the absorber stack and the antireflection coating are all deposited by methods comprising substantially the same acts, and thus the same environment parameters in the process chamber.

A further effect of these exemplary embodiments is that the solar selective coating may be made in an in-line deposition process.

Yet a further effect of these exemplary embodiments is that the solar selective coating may be made and deposited by sputtering processes.

In an in-line sputtering deposition process, the workpiece may be moved in a continuous movement through one plasma region in which one layer is deposited onto the next plasma region where another layer is deposited and so forth. Alternatively, several in-line sputter zones are arranged in series and moved across the workpiece. In either case, the gas composition and plasma intensity may be controllable for a stable deposition rate during the process to ensure a layer of uniform material composition and uniform thickness on the entire workpiece.

One exemplary advantage can be that the workpiece is kept in a controlled vacuum environment throughout the deposition process and during the time between each deposition process, thereby preventing oxidations of the surfaces that subsequently constitute the interface between the individual layers of the solar selective coating.

Another exemplary advantage can be that magnetron and plasma regions may be kept relatively small compared to the size of the workpiece, thereby reducing the cost of production facilities because the equipment's "core" in form of sputter zones with magnetrons, gas inlet channels, sensors and so forth.

The challenge of controlling the process parameters of the deposition process over a large area may also be reduced due to the movement of the workpieces in relation to the deposition regions.

Another exemplary embodiment of the present disclosure may be achieved by a method for making a solar selective coating comprising a three-layer sandwich structure, whereas the adhesion layer can comprise a 110-130 nm thick adhesion layer comprising a metallic layer comprising molybdenum and titanium 95% (w/w) Mo and 5% Ti (w/w), wherein the absorber stack is configured with one absorber layer comprising a 110-130 nm titanium aluminium nitride(s) layer, and whereas the antireflection stack can be configured with one antireflection layer comprising a 50-70 nm silicon nitride(s) layer by a vacuum deposition process (VDP) comprising the following acts:

ion etching of the substrate surface with an ion gun using a process pressure in the range from 1E-5 bar to 5E-2 bar, and argon gas as ionization gas;

providing a substrate temperature above 100° C.;

sputtering for deposition of the adhesion layer (30) comprising a metallic layer comprising molybdenum and titanium using a process pressure in the range 1E-3 bar to 1E-2 bar, and argon as sputtering gas;

sputtering for deposition of the titanium aluminium nitride(s) using a process pressure in the range 1E-3 bar to 1E-2 bar, argon as sputtering gas, and nitrogen as reactive gas using a partial pressure of the reactive gas in the range 1E-6 to 5E-4 mbar, preferably in the range 5E-6 to 1E-4 mbar, even more preferably in the range 1E-5 to 5E-5 mbar; and sputtering for deposition of the silicon nitride(s) layer using a process pressure in the range 1E-3 bar to 1E-2 bar, argon as sputtering gas, and nitrogen as reactive gas using a partial pressure of the reactive gas in the range 1E-6 to 5E-4 mbar, preferably in the range 5E-6 to 1E-4 mbar, even more preferably in the range 1E-5 to 5E-5 mbar.

Still another exemplary embodiment of the present disclosure may be achieved by a method for making a solar selective coating comprising a four-layer sandwich structure, whereas the adhesion layer can comprise a 110-130 nm thick adhesion layer comprising a metallic layer comprising molybdenum and titanium of 95% Mo (w/w) and 5% Ti (w/w), whereas the absorber stack can be configured with one absorber layer comprising a 60-80 nm titanium aluminium nitride layer and one semi-absorber layer comprising a 20-40 nm titanium aluminium oxynitride layer, and whereas the antireflection stack can be configured with one antireflection layer comprising a 70-90 nm silicon oxide(s) layer by a vacuum deposition process (240) comprising the following acts:

ion etching of the substrate with an ion gun using a process pressure in the range 1E-4 bar to 5E-3 bar, and argon gas as ionization gas;

providing a substrate temperature above 100° C.;

sputtering for deposition of the adhesion layer (30) comprising a metallic layer comprising molybdenum and titanium using a process pressure in the range 1E-3 bar to 1E-2 bar, and argon as sputtering gas;

sputtering for deposition of the titanium aluminium nitride layer using a process pressure in the range 1E-3 bar to 1E-2 bar, argon as sputtering gas and nitrogen as reactive gas using a partial pressure of the reactive gas in the range 1E-6 to 5E-4 mbar, preferably in the range 5E-6 to 1E-4 mbar, even more preferably in the range 1E-5 to 5E-5 mbar;

sputtering for deposition of the titanium aluminium oxynitride layer using a process pressure in the range 1E-3 bar to 1E-2 bar, argon as sputtering gas, and nitrogen and oxygen as reactive gases using a partial pressure of the reactive gases in the range 1E-6 to 5E-4 mbar, preferably in the range 5E-6 to 1E-4 mbar, even more preferably in the range 1E-5 to 5E-5 mbar; and sputtering for deposition of the silicon oxide(s) layer using a process pressure in the range 1E-3 bar to 1E-2 bar, argon as sputtering gas, and oxygen as reactive gas using a partial pressure of the reactive gas in the range 1E-6 to 5E-4 mbar, preferably in the range 5E-6 to 1E-4 mbar, even more preferably in the range 1E-5 to 5E-5 mbar.

The adhesion layer may be deposited by a sputtering process comprising, for example, DC sputtering, pulsed DC sputtering, HIPIMS (High Power Impulse Magnetron Sputtering) or RF sputtering.

The absorber stack and antireflection stack may be deposited by a sputtering process comprising of for example pulsed DC sputtering, HIPIMS (High Power Impulse Magnetron Sputtering) or RF sputtering.

A further effect of this exemplary embodiment is seen from the accelerated corrosion measurements shown in FIG. 4. The tests show a significant improvement in regard to decreased corrosion rate of the test samples deposited with the four-layer solar selective coating. This may be advantageous in regard to improved lifetime of the coating, improved corrosion protection of a substrate and improved quality of the coating throughout the lifetime.

Yet a further effect of the exemplary embodiment can be seen from the calculated reflectance spectrum shown in FIG. 5. The calculated reflectance versus wavelength shows that reflectance is low when the Solar insolation AM1.5 spectrum is high. This gives the advantage of a high absorption level of 96% of the solar insolation.

The exemplary embodiment of the three-layer solar selective shows similar effects of increased corrosion resistance and absorption levels of 93%, and thus has the same advantages.

The exemplary three-layer solar selective coating may reduce the costs and time of production due to only comprising three-layers compared to the four-layer coating. The exemplary four-layer coating can return a higher calculated absorption level. This illustrates how several solar selective coatings may be applicable and that the solar selective coating may be chosen in consideration of production cost, yield, application, lifetime or other features.

An exemplary object of the present disclosure may be achieved by a solar absorber obtained by a process of depositing a solar selective coating by a vacuum deposition process (VDP) onto a thermal absorber configuration, whereas the solar selective coating can be made by:
  providing a pre-polished substrate;
  preparing the substrate surface by ion-etching;
  depositing an adhesion layer onto the prepared substrate surface;
  depositing an absorber stack onto the adhesion layer one layer at a time; and
  depositing an antireflection stack onto the absorber stack one layer at a time, whereas the adhesion layer can comprise a metallic layer comprising a refractory metal and a dope-material. The dope-material can comprise a metal or metalloid, and the metallic layer can be configured with an amorphous disordered structure.

Another exemplary object of the present disclosure may be achieved by a solar absorber obtained by a process of depositing a solar selective coating by a vacuum deposition process (VDP) onto the thermal absorber configuration. The exemplary solar selective coating can be made by:
  providing a pre-polished substrate;
  preparing the substrate surface by ion-etching;
  depositing an adhesion layer onto the prepared substrate surface;
  depositing an absorber stack onto the adhesion layer one layer at a time; and
  depositing an antireflection stack onto the absorber stack one layer at a time, wherein the adhesion layer comprises a metallic layer comprising molybdenum and titanium.

The effects and advantages of the above-described exemplary embodiments may be similar as those already described, including the following exemplary effects:
  The solar selective coating is configured to be spectrally selective absorbing with high absorption of solar radiation and low loss of absorbed energy as infrared radiation (heat).
  The adhesion layer constitutes a good reflector in relation to IR radiation or thermal emittance from the substrate side.
  The adhesion layer constitutes a good adhesion or bonding layer for the absorber stack.
  The adhesion layer constitutes a diffusion barrier in relation to absorber stack.
  The adhesion layer is highly resistant to corrosion.

In general, the advantages may be improved lifetime of the coating, improved corrosion protection of the substrate and improved quality of the coating throughout the lifetime.

One exemplary embodiment of the present disclosure may be achieved by a method for depositing a solar selective coating comprising a further act of preparing the pre-polished substrate surface before depositing the adhesion layer by ion-etching.

One exemplary effect of this exemplary embodiment can be that surface preparation, which reduces micro surface roughness related to sharp micro edges of the substrate surface's topography and thus smooths the substrate surface shows, in a surprising extent, a significant improvement of the corrosion properties, which again may be advantageous in regard to improved lifetime of the coating, improved protection of the substrate and improved quality of the coating throughout the lifetime.

Another exemplary embodiment of the present disclosure may be achieved by a solar absorber obtained by a process, whereby the processes can be performed as in-line deposition processes.

Absorbers for solar installations are often bulky items, typically 3 to 5 meters long workpieces, for example pipes or sheets. The size of the workpieces makes it a special challenge to establish process equipment, where discharge of a uniform surface on the whole subject in a conventional vacuum chamber is achieved. The traditional solution will be large vacuum chambers with associated challenges of managing gas composition and plasma conditions throughout the area of the workpiece. Existing solar absorbers deposited with selective coatings often require several processes, one for each layer or stack comprised in the solar selective coating.

The effects and advantages of this exemplary embodiment can be similar as those previously described, including the following advantages:

The workpiece is kept in a controlled vacuum environment throughout the deposition process and during the time between each deposition process, thereby preventing oxidations of the surfaces that subsequently constitute the interface between the individual layers of the solar selective coating.

The magnetron and plasma regions may be kept relatively small compared to the size of the workpiece thereby reducing the costs of production facilities because of the equipment's "core" in form of sputter zones with magnetrons, gas inlet channels, sensors and so forth.

In one exemplary embodiment, an alternative material for dope-materials for cathodic protection of the Molybdenum in the adhesion layer may be used if an amorphous disordered structure is established. The important characteristics for potential metals or metalloids being dope-materials for cathodic protection are their ability to form stable and dense oxide layers in the range of pH from pH=4 to pH=9 and in the range of potential from −1500 mV up to +1000 mV. Among metals other than Titanium with these characteristics can also be Zirconium (Zr), Tantalum (Ta) and Hafnium (Hf). Other exemplary alternatives may be aluminium and chromium or metalloids with these characteristics, see, e.g., Pourbaix diagrams. Silicon (Si) may be one example of a metalloid.

In one exemplary embodiment, alternative materials to Molybdenum for the IR layer may be used. Alternative materials may have good IR reflection properties. Alternative materials may have a high melting point (<2000° C.) for high temperature CSP applications (>150° C.). Alternative materials may have an acceptable sputter-rate/sputter yield in the PVD process. For the purpose of IR reflection in the solar absorber stack, the IR reflection properties are important in the wavelength range from 5 μm and higher. Alternative IR reflector materials having high melting points comprise elements selected from the group of refractory metals. Alternative IR reflector materials may comprise elements selected from the group of molybdenum (Mo), niobium (Nb), tantalum (Ta), tungsten (W) and rhenium (Re). They all share some properties, such as a high melting point of above 2000° C., high hardness at room temperature, and they are chemically inert and have a relatively high density.

Mo has the highest reflectance from the important wavelength of approximately 5 μm and upwards, and Mo also have the highest sputter yield of the refractory metals. In view of reflectance, tantalum and tungsten are alternatives to molybdenum, as both metals have minor differences to the level of reflectance for molybdenum. In view of corrosion properties tantalum is the most attractive alternative, as tantalum has greater affinity to oxygen than has tungsten. From a technical point of view tantalum is an attractive alternative to molybdenum. Tungsten is also a potential alternative to molybdenum as IR reflector layer; however from a material cost point of view, tantalum as well as tungsten a significantly more costly solution. Due to the lower sputter rates for tantalum and for tungsten, the production cost for depositing these alternatives are also higher than for depositing molybdenum.

The aspects described above and further aspects, features and advantages of the present disclosure may also be found in the exemplary embodiments which are described in the following with reference to the appended drawings and claims.

BRIEF DESCRIPTION OF THE DRAWINGS

Further exemplary embodiments of the present disclosure are detailed in the description of the Figures, where this description shall not limit the scope of the present disclosure. The Figures show.

Figure 1:
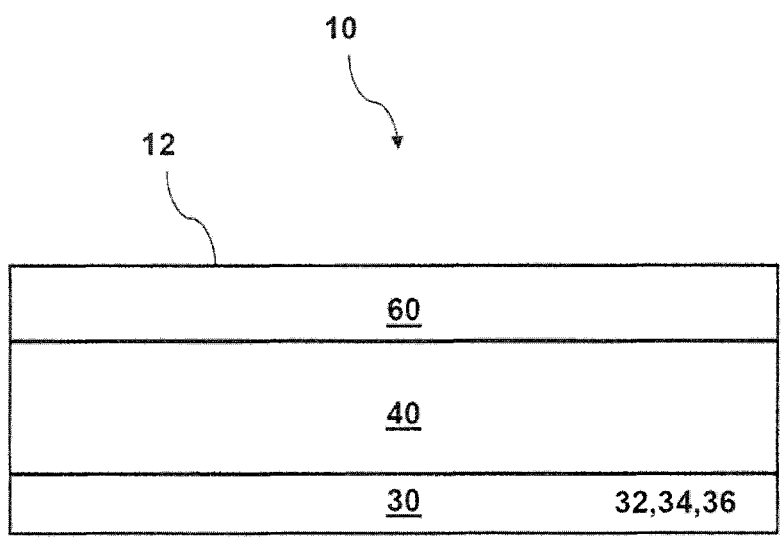
FIG. 1 is a cross-sectional side view of an exemplary structure of the solar selective coating.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure as defined by the appended claims.

DETAILED DESCRIPTION OF EXEMPLARY EMBODIMENTS

FIG. 1 illustrates a cross-sectional side view of an exemplary structure of the solar selective coating 10 according to an exemplary embodiment of the present disclosure. The exemplary solar selective coating 10 comprises an adhesion layer 30, an absorber stack 40, and an antireflection stack 60.

The solar selective coating 10 constitutes a sandwich construction 70 configured with the adhesion layer 30 which may be deposited onto a substrate 20, the absorber stack 40 deposited on the adhesion layer 30 and the antireflection stack 60 deposited on the absorber stack 40. The absorber stack 40 comprises at least one absorber layer 42 and may comprise additional absorber layers 42 or semi-absorber layers 44. The antireflection stack 60 comprises at least one antireflection layer 62 and may comprise additional antireflection layers 62. The solar selective coating 10 comprises one surface constituting the boundary to the ambient surroundings and may be a solar selective surface 12. This surface is opposite to the surface of the antireflection stack 60 constituting the boundary to the absorber stack 40. The adhesion layer 30 comprises a metallic layer comprising a refractory metal 36 and dope-material 34. The metallic layer is configured with an amorphous disordered structure 32.

Figures 2A, 2B:
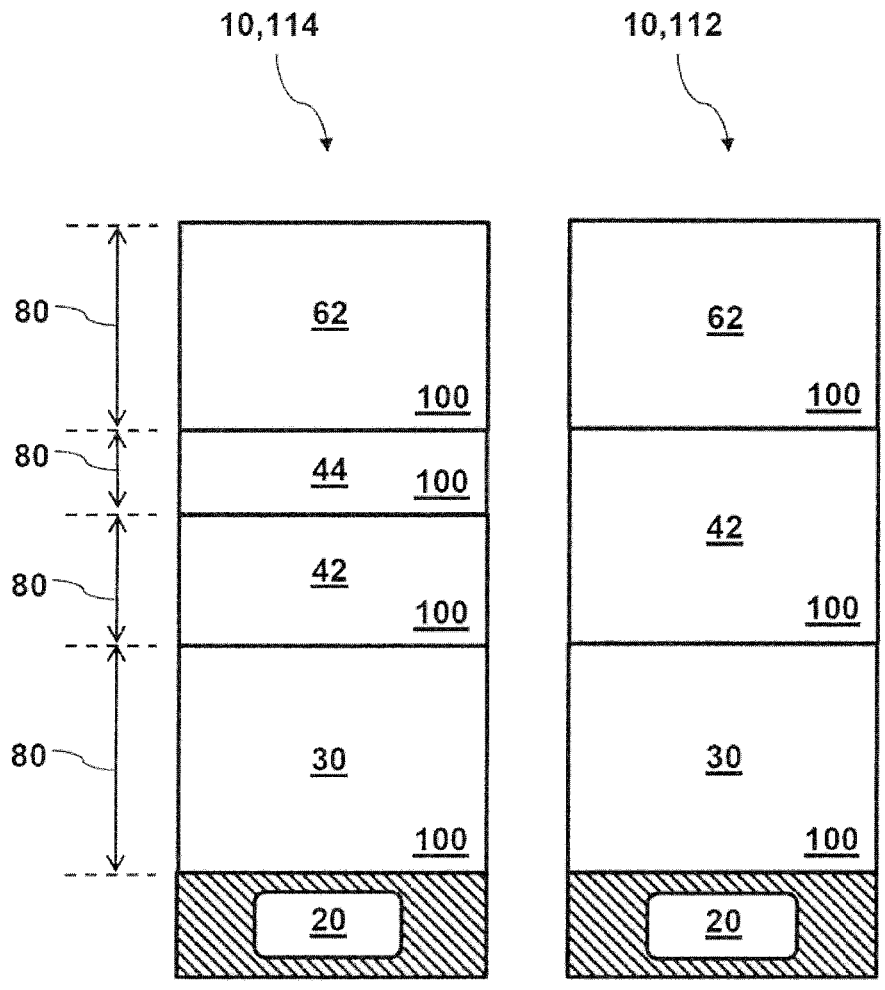
FIG. 2A is a cross-sectional side view of an exemplary four-layer stack with solar selective coating deposited on a substrate.
FIG. 2B is a cross-sectional side view of an exemplary three-layer stack with solar selective coating deposited on the substrate.

FIGS. 2A and 2B illustrate side cross-sectional views of solar selective coatings 10 deposited on a substrate 20. For example, FIG. 2A shows an exemplary four-layer stack 114 comprising an adhesion layer 30, an absorber layer 42, a semi-absorber layer 44 and an antireflection layer 62. The solar selective coating 10 constitutes a sandwich construction 70 configured with the adhesion layer 30 deposited on a substrate 20, the absorber layer 42 deposited on the adhesion layer 30, the semi-absorber layer 44 deposited on the absorber layer 42 and the antireflection layer 62 deposited on the semi-absorber layer 44.

FIG. 2B shows an exemplary three-layer stack 112 comprising an adhesion layer 30, an ab-sorber layer 42, and an antireflection layer 62. The solar selective coating 10 constitutes a sandwich construction 70 configured with the adhesion layer 30 deposited on a substrate 20, the absorber layer 42 deposited on the adhesion layer 30, and the antireflection layer 62 deposited on the absorber layer 42.

The exemplary individual layers of the selective coatings may be described by a layer thickness 80 and refractive index of the individual layers 100 provided in the solar selective coating 10. The interfaces between the layers may be described by boundary conditions by which reflectance and absorbance of incident radiation on the solar selective coating 10 may be calculated through the coating using classical optical theory.

Figure 3A:
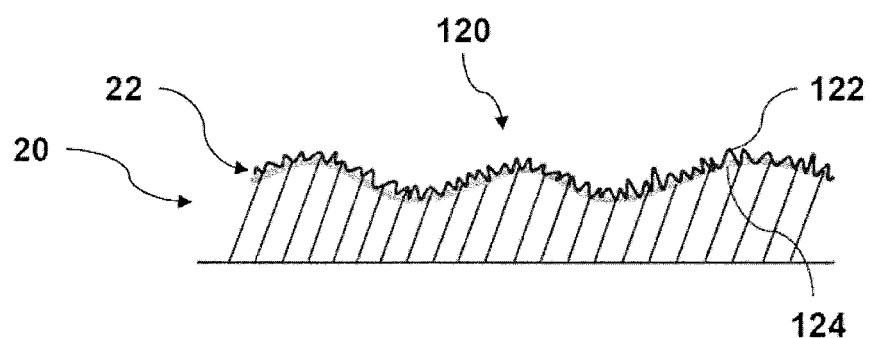
FIG. 3A is a cross-sectional side view of an exemplary substrate surface with surface roughness comprising a micro roughness.
Figure 3B:
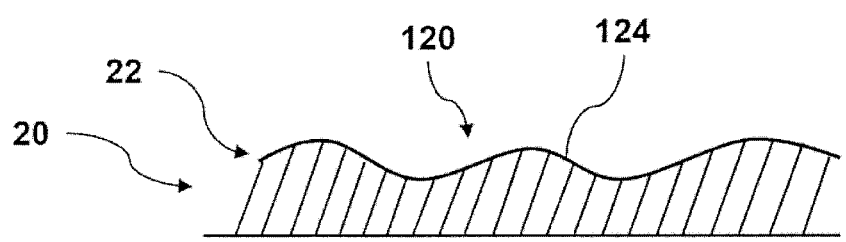
FIG. 3B is a cross-sectional side view of an exemplary substrate surface with surface roughness comprising a macro roughness.

FIGS. 3A and 3B illustrate side cross-sectional view of a substrate 20 comprising a substrate surface 22 with surface roughness 120. For example, FIG. 3A illustrates an exemplary substrate surface 22 comprising micro rough-ness 122 and macro roughness 124. FIG. 3B illustrates an exemplary polished substrate surface 22 comprising only macro roughness 124 after the polishing surface treatment. The substrate surface 22 may be polished using ion-etching 228.

A raw and also a pre-polished 230 substrate surface may comprise tips and edges of nano and micro sizes. By polishing the substrate surface 22 the surface structure may be changed to comprise rounded and smoothed tips and edges upon which the solar selective coating 10 may be deposited.

Figure 4:
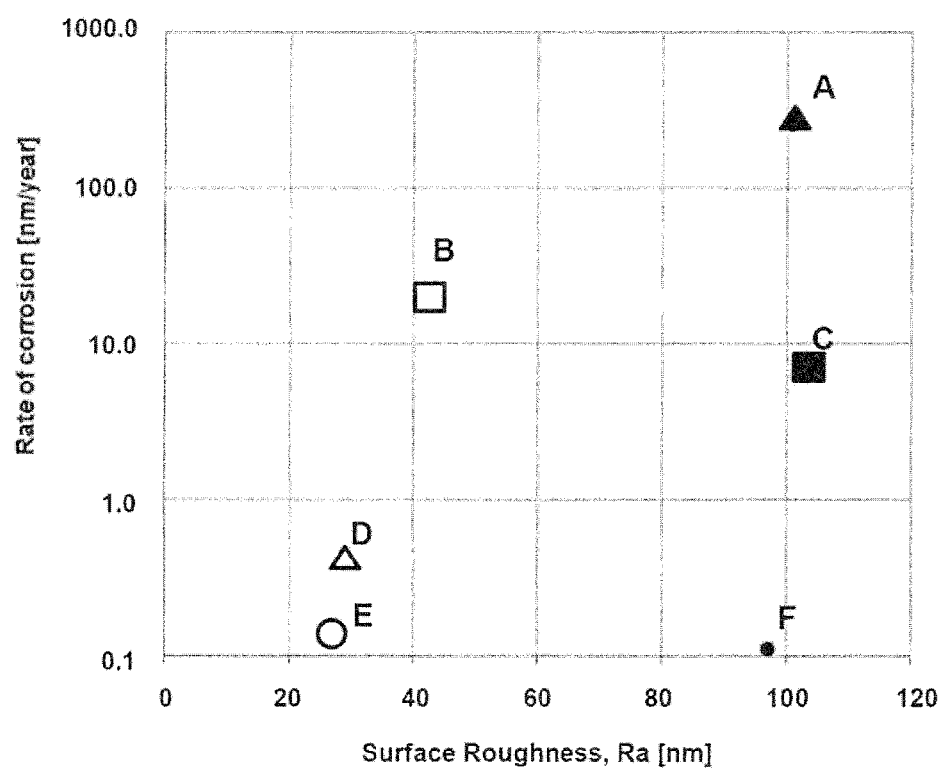
FIG. 4 is a graph showing a rate of corrosion of solar absorbers with substrate surfaces prepared by different techniques.

The graph shown in FIG. 4 illustrates a rate of corrosion of solar absorbers versus substrate surface roughness obtained by different techniques of substrate preparation and for solar absorbers with different solar selective coatings. The surface roughness can be measured as arithmetic average Ra using a Bruker Dektak XT profilometer. The measurements are performed using a setting of the cut-off filter to about 0.8 µm.

The exemplary measurements are performed as accelerated corrosion measurements and are performed by use of an Avesta cell with Biologic potentiostat/galvanostat. The test samples are tested in a mild solution (pH 6.0) of sodium chloride, sodium acetate trihydrate and acetic acid, balanced with water. The test procedure is performed using a first anodic test sequence and second a cathodic test sequence, during which test sequences the potential is varied from −10V to +10V and concurrently measuring the current across the test samples. The measured current represents the ongoing corrosion process. The procedure and apparatus used for the accelerated corrosion measurements are well-known to a person skilled in the art.

The exemplary test samples are as follows:
  A: Standard tube without a solar selective coating
  B: Electro-polished tube without a solar selective coating
  C: Standard tube deposited with solar selective coating A
  D: Grinded and electro-polished tube deposited with solar selective coating A
  E: Polished and electro-polished tube deposited with solar selective coating A
  F: Electro-polished tube deposited with solar selective coating A Solar selective coating A comprises a four-layer sandwich structure deposited using VDP (240). The coating comprises a 120 nm thick adhesion layer comprising a metallic layer comprising 95% Mo (w/w) and 5% Ti (w/w), a 70 nm thick titanium aluminium nitride absorber layer, a 30 nm thick titanium aluminium oxynitride semi-absorber layer, and a 80 nm thick silicon oxide(s) antireflection layer.

The test samples comprising electro-polished tubes deposited with *solar selective coating A* shows a significant improvement in regard to decreased corrosion rate.

Furthermore, the measurements show that test samples without solar selective coating but with different surface preparations show a significant improvement in regard to decreased corrosion rate only by use of smoothing the substrate surface for example by electro-polishing.

Thus, the exemplary performed measurement shows that smoothing the substrate surface and subsequently depositing a solar selective coating A is found, in a surprising extent, to improve the corrosion properties.

Figure 5:
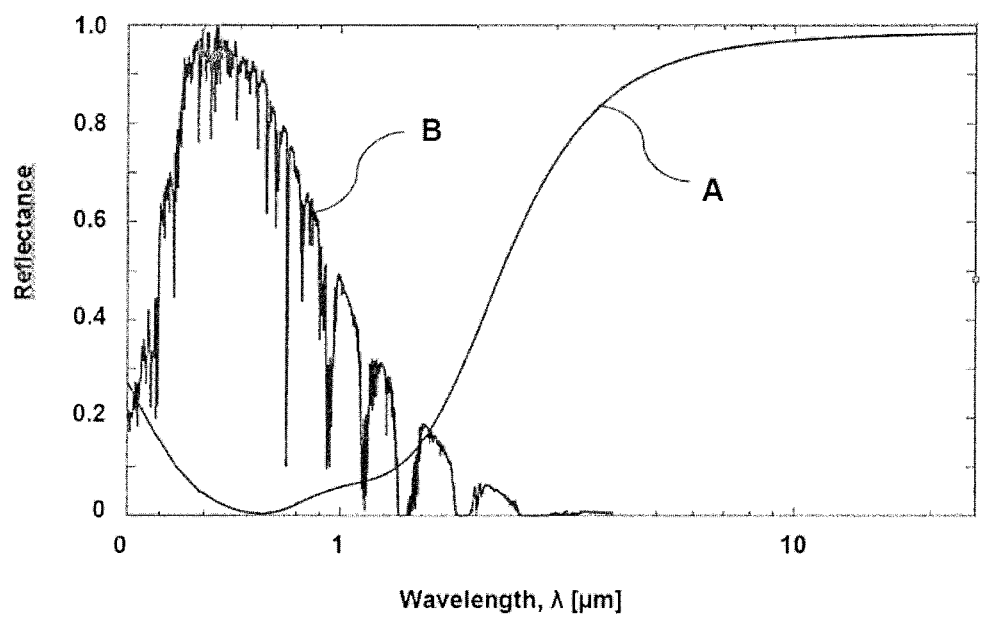
FIG. 5 is a graph of a calculated reflectance (A) versus wavelength for a four-layer solar selective coating and the Solar insolation AM1.5 spectrum (B) versus wavelength.

FIG. 5 illustrates an exemplary graph of a calculated reflectance (A) versus a wavelength for a four-layer solar selective coating and the Solar insolation AM1.5 spectrum (B) versus wavelength. The exemplary four-layer solar selective coating comprises a 120 nm thick adhesion layer comprising a metallic layer comprising 95% Mo (w/w) and 5% Ti (w/w), a 70 nm thick titanium aluminium nitride absorber layer, a 30 nm thick titanium aluminium oxynitride semi-absorber layer, and a 80 nm thick silicon oxide(s) antireflection layer and is the coating also used for the measurement shown in FIG. 4.

The reflectance of the exemplary four-layer solar selective coating is calculated using a matrix formalism algorithm based on boundary conditions and based on input of the reflective indices of individual layer materials 90 and sequence of the individual layers 100 at a temperature of 350° C. The four-layer solar selective coating is calculated to obtain an optical absorption of 93% of the Solar insolation AM 1.5 spectrum.

For various exemplary embodiments of the present disclosure, usable solar selective coatings may be chosen from the range of solutions with a calculated optical absorption >80% of the spectrum Solar insolation AM 1.5 and an emittance <30% at a temperature of 350° C.

Figure 6A:
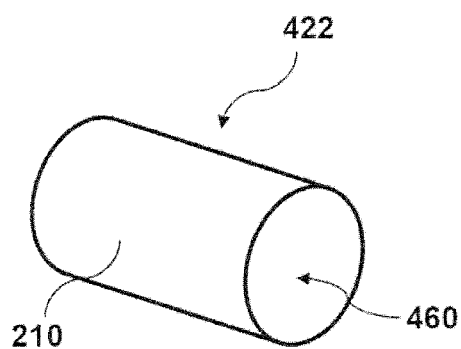
FIGS. 6A-6D are perspective view of different constructions of spherical thermal absorber configurations(s)
Figure 6B:
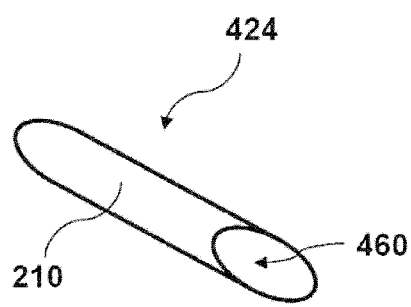
Figure 6C:
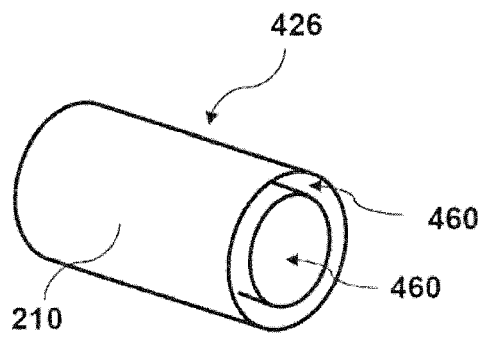
Figure 6D:
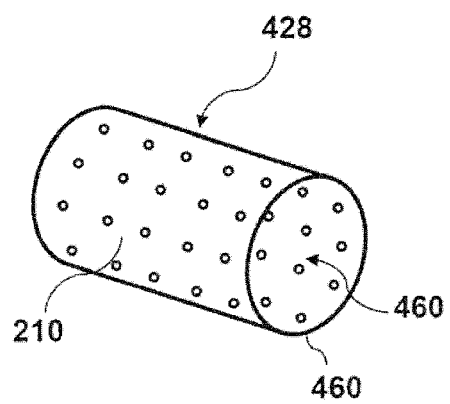

FIGS. 6A-6D illustrate perspective view of different constructions of spherical thermal absorber configuration(s) 420. An exemplary circular tube 422 is illustrated in FIG. 6A with the outer surface being the substrate surface 210 onto which the solar selective coating 10 may be deposited. The inner surface may constitute the flow channel 460. FIG. 6B illustrates an exemplary non-circular tube 424 with the outer surface being the substrate surface 210 onto which the solar selective coating 10 may be deposited. The inner surface may constitute the flow channel 460. FIG. 6C illustrates an exemplary double walled tube 426 which may be described as comprising two tubes: a large diameter tube and a small diameter tube with the small diameter tube placed inside and parallel to the large diameter tube. The outer surface of the double walled tube 426, being the substrate surface 210 onto which the solar selective coating 10 may be deposited. The inner surface of the small diameter tube may constitute one flow channel 460 which preferably is not used for heat conduction. The annular channel between the two tubes may also constitute a flow channel 460. FIG. 6D illustrates an exemplary pillow-plate tube 428, which is a pillow-plate bend into a tube-shape. The pillow-plate comprises two plates joined together to form internal flow channels 460 and thus, like the double walled tube 426 the pillow-plate tube 428 comprises the internal flow channels 460 within the pillow-plate and a flow channel 460 encircled by the pillow-plate which preferably is not used for heat conduction.

Figure 7A:
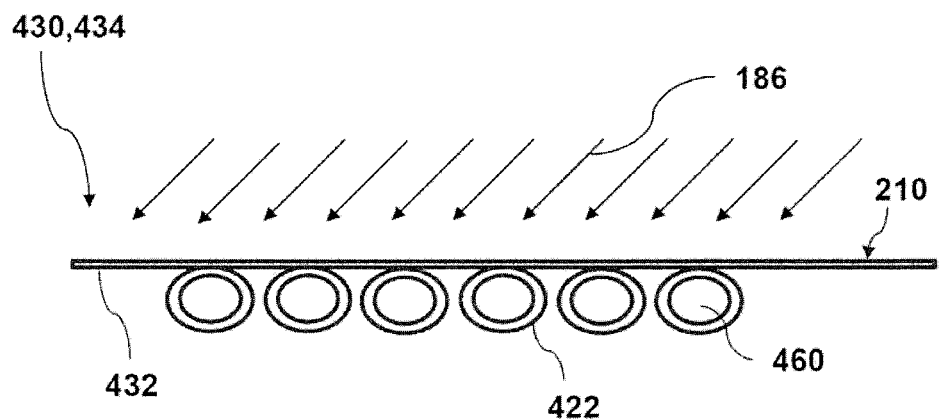
FIG. 7A is a cross-sectional view of a planar thermal absorber configuration of one exemplary embodiment according to the present disclosure.
Figure 7B:
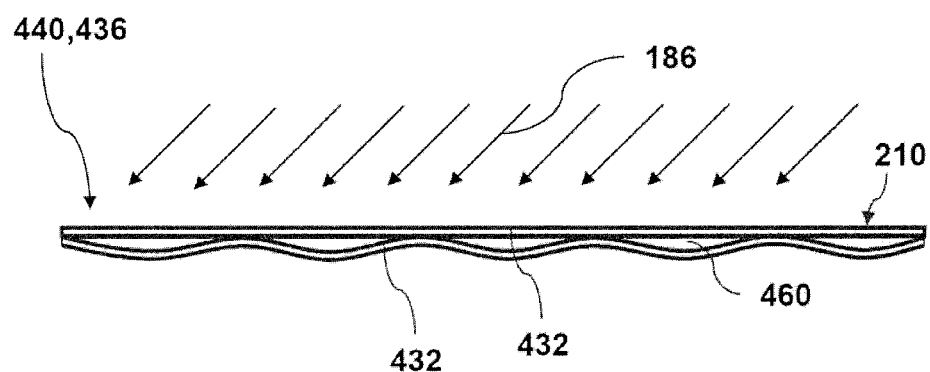
FIG. 7B is a cross-sectional view of the planar thermal absorber configuration of another exemplary embodiment according to the present disclosure.

FIGS. 7A and 7B illustrate two exemplary embodiments of a planar thermal absorber configuration(s) 430. FIG. 7A shows an exemplary flat thermal absorber configuration 434, and FIG. 7B shows an exemplary pressure formed thermal absorber configuration 436.

The flat thermal absorber configuration 434 illustrated in FIG. 7A comprises circular tubes 422 mechanically connected to a sheet 432. The circular tubes 422 are configured with flow channels 460 and the surface of the sheet 432 facing away from the circular tubes 422 comprises the substrate surface 210 for the solar selective coating 10 and thus the surface facing the sun, illustrated by solar insolation 186 onto the surface.

In FIG. 7B, the exemplary pressure formed thermal absorber configuration 436 comprises two sheets 432 joined by high-pressure joints. The pressure formed thermal absorber configuration 436 constitutes flow channels 460 comprised between the two sheets 432. The surface of the pressure formed thermal absorber configuration 436 facing towards the solar insolation 186 constitutes the substrate surface 210 for the solar selective coating 10.

The thermal transfer from the flat thermal absorber configuration 434 in FIG. 7A may be lower than the thermal transfer obtainable by the pressure formed thermal absorber configuration 436 in FIG. 7B because of the direct contact of the fluid with the flat sheet 432 comprising the solar selective coating 10. For the flat thermal absorber configuration 434, the flat sheet 432 comprising the solar selective coating 10 can only be connected in the areas connecting the tubes to the sheet 432 and furthermore, the thermal contact to the fluid is thus indirect from the sheet to the fluid through the tube walls.

Figure 8:
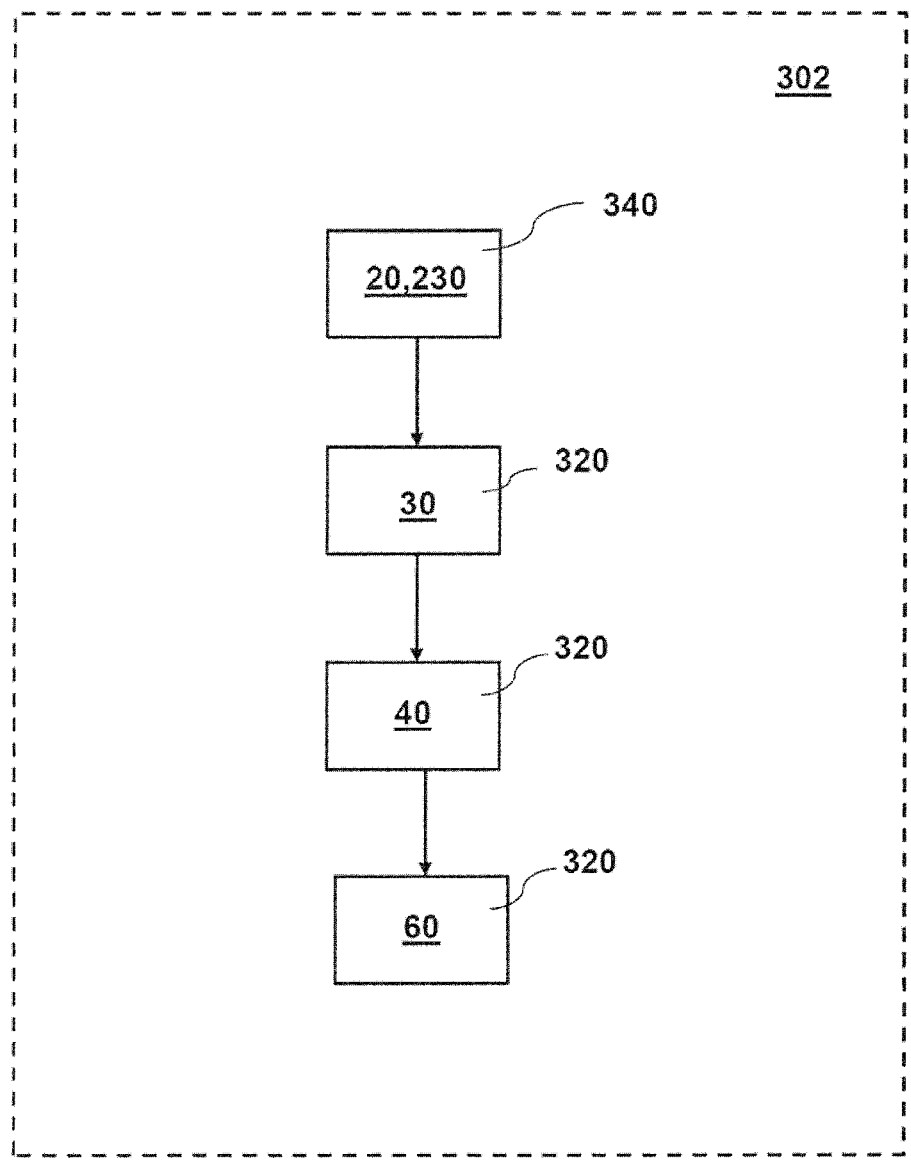
FIG. 8 is a flow diagram of a method for making a solar selective coating by a vacuum deposition process according to an exemplary embodiment of the present disclosure.

FIG. 8 illustrates a flow diagram of a method for making (302) a solar selective coating by a vacuum deposition process 240 according to an exemplary embodiment of the present disclosure. For example, a pre-polished 230 substrate 20 can be provided onto which the adhesion layer 30 is deposited 320. The absorber stack 40 is deposited 320 onto the adhesion layer 30. In case the absorber stack 40 comprises multiple layers the individual layers 100 are deposited one layer at a time. The antireflection stack 60 is deposited 320 onto the absorber stack 40. In case the antireflection stack 60 comprises multiple layers the individual layers 100 are deposited one layer at a time.

Figure 9:
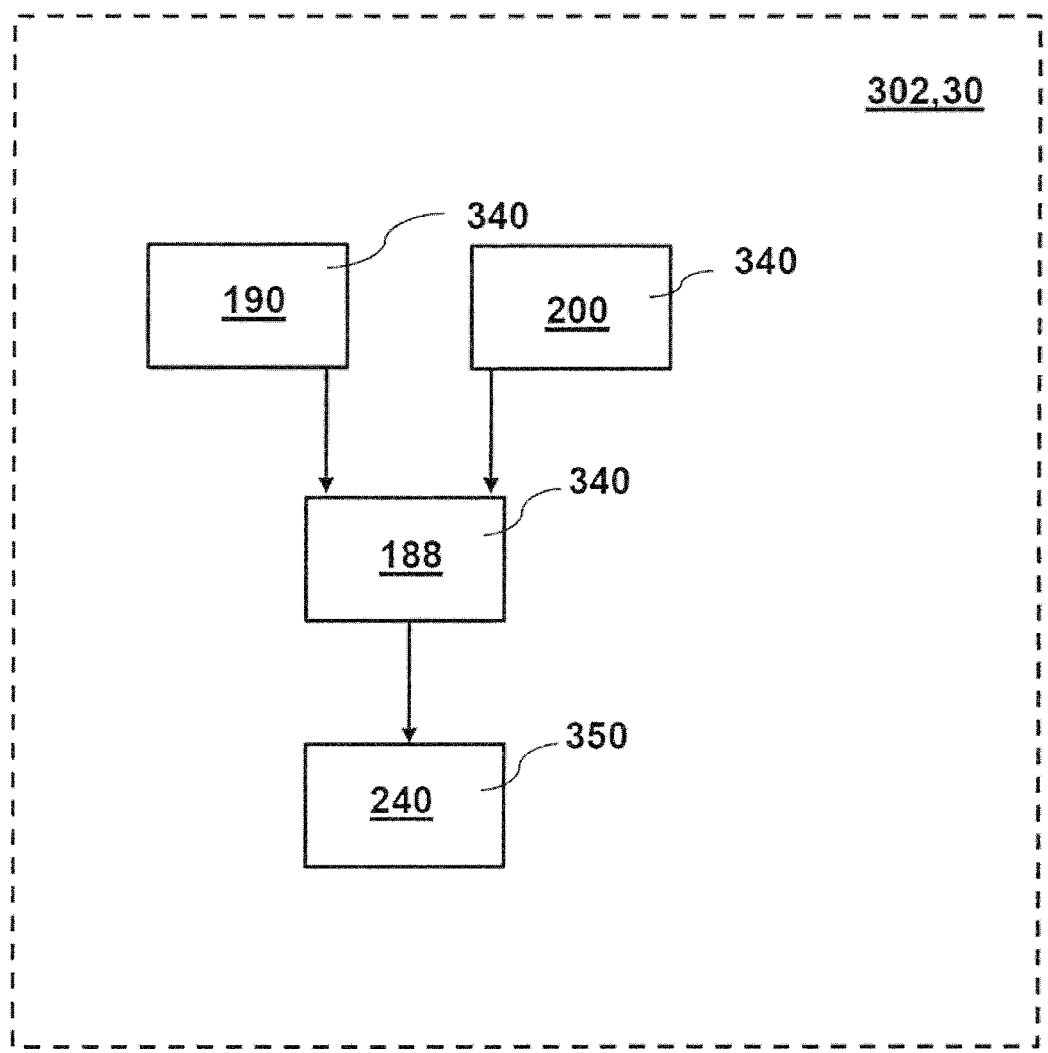
FIG. 9 is a flow diagram of a method for depositing the adhesion layer onto the substrate according to an exemplary embodiment of the present disclosure.

FIG. 9 illustrates a flow diagram of a method 302 for depositing the adhesion layer 30 onto the substrate according to an exemplary embodiment of the present disclosure as part of the method for making a solar selective coating. For example, the adhesion layer 30 can be deposited 320 by a vacuum deposition process 240 and the method 302 comprises several acts. A base pressure 190 and a substrate temperature 200 is provided 340. Prior to deposition of the adhesion layer by the vacuum deposition process 240 a process pressure 188 is provided 340 by adding a protective atmosphere to the process chamber. The deposition is performed 350 by a vacuum deposition process 240.

Figure 10:
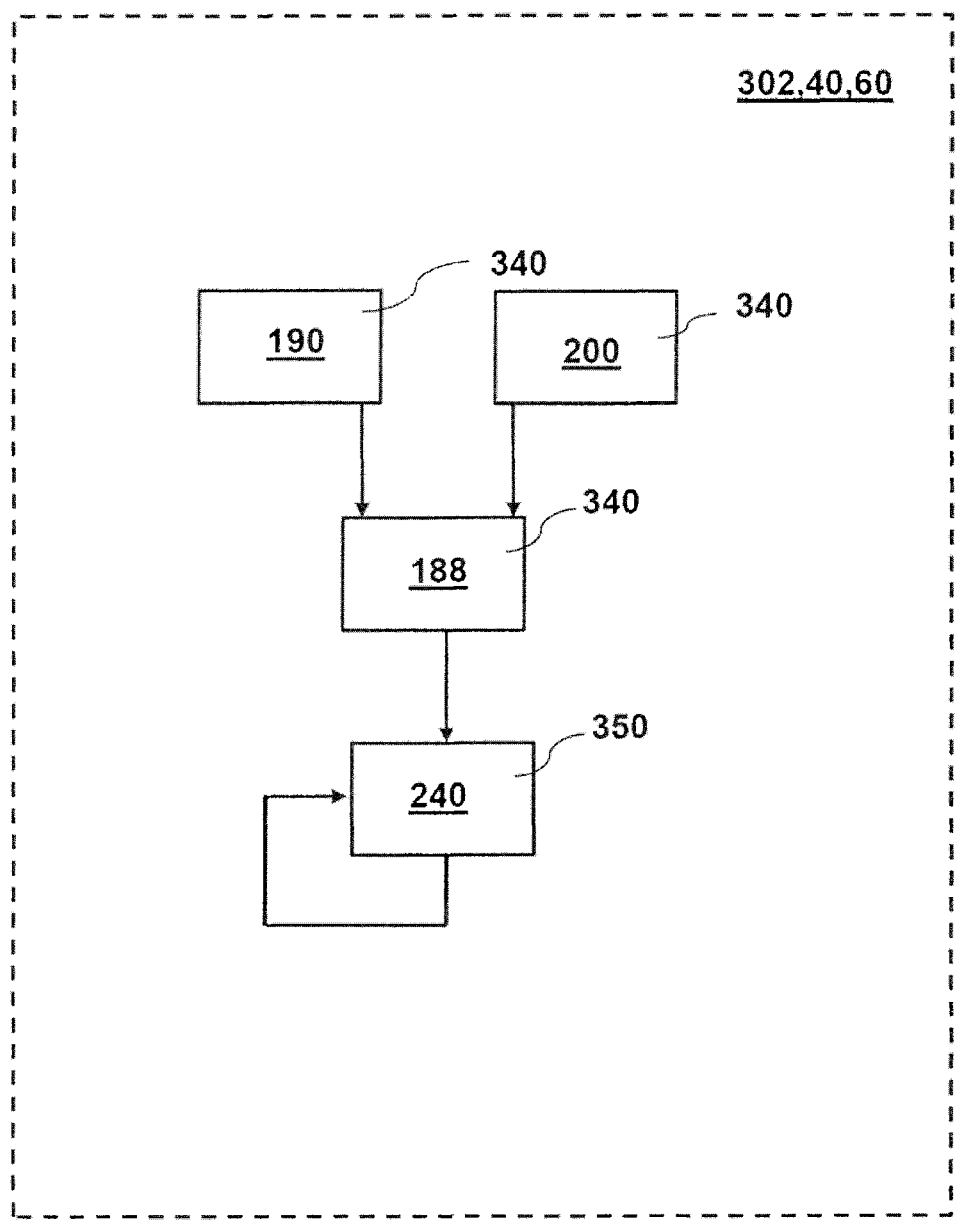
FIG. 10 is a flow diagram of a method for depositing the absorber stack or the antireflection stack onto the substrate according to an exemplary embodiment of the present disclosure.

FIG. 10 illustrates a flow diagram of a method 302 for depositing the absorber stack 40 or the antireflection stack 60 onto the substrate 20 according to an exemplary embodiment of the present disclosure as part of the method for making a solar selective coating. For example, the exemplary method can comprise similar procedures as the method for performing the adhesion layer deposition. The absorber or antireflection stack is deposited by a vacuum deposition process 240 wherein a base pressure 190 and a substrate temperature 200 is provided 340. Prior to deposition of the adhesion layer by the vacuum deposition process 240 a process pressure 188 is provided 340 by adding a protective atmosphere to the process chamber. The deposition is performed 350 by a vacuum deposition process 240. This act may be performed several times if the stack comprises multiple layers.

EXEMPLARY LIST OF REFERENCE SIGNS

| | |
|---|---|
| 10 | solar selective coating |
| 12 | solar selective surface |
| 20 | substrate |
| 22 | substrate surface |
| 30 | adhesion layer |
| 32 | amorphous disordered structure |
| 34 | dope-material |
| 36 | refractory metal |
| 40 | absorber stack |
| 42 | absorber layer |
| 44 | semi-absorber layer |
| 60 | antireflection stack |
| 62 | antireflection layer |
| 70 | sandwich construction |
| 80 | layer thickness |
| 82 | adhesion layer thickness |
| 90 | layer material |
| 100 | individual layers |
| 112 | three-layer stack |
| 114 | four-layer stack |
| 120 | surface roughness |
| 122 | micro roughness |
| 124 | macro roughness |
| 186 | solar insolation |
| 188 | process pressure |
| 190 | base pressure |
| 200 | substrate temperature |
| 210 | substrate surface |
| 220 | surface preparation |
| 228 | ion-etching |
| 230 | pre-polished |
| 240 | vacuum deposition process |
| 250 | ion gun |
| 260 | sputtering |
| 300 | method for depositing |
| 302 | method for making |
| 310 | preparing |
| 320 | depositing |

-continued

| | |
|---|---|
| 330 | etching |
| 340 | providing |
| 350 | performing |
| 400 | solar absorber |
| 402 | thermal absorber means |
| 420 | spherical thermal absorber means |
| 422 | circular tube |
| 424 | non-circular tube |
| 426 | double walled tube |
| 428 | pillow-plate tube |
| 430 | planar thermal absorber means |
| 432 | sheet |
| 434 | flat thermal absorber means |
| 436 | pressure formed thermal absorber means |
| 440 | embossed thermal absorber means |
| 460 | flow channel |

The invention claimed is:

1. A solar selective coating comprising:
an adhesion layer;
an absorber stack includes at least one absorber layer; and
an antireflection includes at least one antireflection layer;
wherein the adhesion layer, the absorber stack and the antireflection stack are configured and arranged in a sandwich construction in which the adhesion layer is deposited on a substrate, the absorber stack is deposited on the adhesion layer, and the antireflection stack deposited on the absorber stack; and
wherein the adhesion layer includes a metallic layer with a refractory metal and a dope-material, the dope-material having a metal or a metalloid, the metallic layer being configured with an amorphous disordered structure; and
wherein the metallic layer includes molybdenum as refractory metal and titanium as dope-material.

2. The solar selective coating according to claim 1, wherein the adhesion layer has an adhesion layer thickness in a range of 30 nm to 500 nm.

3. The solar selective coating according to claim 2, wherein the range is 80 nm to 200 nm.

4. The solar selective coating according to claim 3, wherein the range is 110 nm to 130 nm.

5. The solar selective coating according to claim 1, wherein the metallic layer includes 85-99% (w/w) Mo and 1-15% (w/w) Ti.

6. The solar selective coating according to claim 5, wherein the metallic layer includes 90-97% (w/w) Mo and 3-10% (w/w) Ti.

7. The solar selective coating according to claim 6, wherein the metallic layer includes 95-96% (w/w) Mo and 4-5% (w/w) Ti.

8. The solar selective coating according to claim 1, wherein the at least one absorber layer includes at least one of a ceramic composition or a metallic composition including elements selected from the group consisting of: aluminium, nitrogen, titanium, oxygen or combinations thereof.

9. The solar selective coating according to claim 1, wherein the at least one antireflection layer includes a ceramic composition including elements selected from the group consisting of: at least one silicon nitride, at least one silicon oxide, at least one aluminium nitride, at least one aluminium oxide, at least one titanium oxide or combinations thereof.

10. The solar selective coating according to claim 1, wherein the sandwich construction includes a three-layer sandwich structure, wherein: the adhesion layer has a 110-130 nm thickness, the metallic layer including 85-99% (w/w) Mo and 1-15% (w/w) Ti, the absorber stack configured with a single absorber layer including a 110-130 nm titanium aluminium nitride layer, and the antireflection stack configured with a single antireflection layer including at least one 50-70 nm silicon nitride layer.

11. The solar selective coating according to claim 1, wherein the sandwich construction includes a four-layer sandwich structure, wherein: the adhesion layer comprises a 110-130 nm thickness, the metallic layer including 85-99% (w/w) Mo and 1-15% (w/w) Ti, the absorber stack is configured and arranged with a single absorber layer including a 60-80 nm titanium aluminium nitride layer, and a single semi-absorber layer including a 20-40 nm titanium aluminium oxynitride layer, and the antireflection stack is configured with a single antireflection layer including at least one 70-90 nm silicon oxide layer.

12. A solar absorber, comprising:
a solar selective coating deposited on a substrate, the solar selective coating including an adhesion layer;
an absorber stack including at least one absorber layer; and an antireflection stack including at least one antireflection layer,
wherein the adhesion layers, the absorber stack and the antireflection stack are provided in a sandwich construction in which the adhesion layer is deposited on the substrate, the absorber stack is deposited on the adhesion layer, and the antireflection stack deposited on the absorber stack,
wherein the adhesion layer includes a metallic layer with a refractory metal and a dope-material, the dope-material including a metal or a metalloid, the metallic layer being configured with an amorphous disordered structure, and wherein a surface of the substrate is a pre-polished surface, and the substrate includes at least one high temperature stable metallic alloy; and
wherein the metallic layer includes molybdenum as refractory metal and titanium as dope-material.

13. The solar absorber according to claim 12, wherein the substrate includes a thermal absorber configuration.

14. The solar absorber according to claim 12, wherein the substrate includes a pressure formed thermal absorber configuration configured with a thermal absorber panel which includes at least two joinable sheets joined by high pressure joints, the thermal absorber panel including at least one flow channel, at least one inlet, and at least one outlet, and wherein the at least one flow channel is a pressure expanded flow channel.

15. A method for making a solar selective coating deposited on a substrate by a vacuum deposition process, comprising:
providing the substrate which is pre-polished;
depositing an adhesion layer onto the pre-polished substrate;
depositing an absorber stack onto the adhesion layer one layer at a time; and
depositing an antireflection stack onto the absorber stack one layer at a time,
wherein the adhesion layer includes a metallic layer with a refractory metal and a dope-material, the dope-material including a metal or a metalloid;
wherein the metallic layer is configured with an amorphous disordered structure; and
wherein the metallic layer includes molybdenum as refractory metal and titanium as dope-material.

16. The method according to claim 15, wherein the adhesion layer is deposited onto the substrate by:
providing a base pressure of less than 1E-4 mbar, providing a substrate temperature above 50° C.;
providing a process pressure of less than 1E-1 mbar by providing a protective atmosphere to a process chamber of an instrument grade argon gas prior to a deposition of the adhesion layer by a vacuum deposition process; and
performing the vacuum deposition process.

17. The method according to claim 15, wherein the absorber stack is deposited onto the adhesion layer by:
providing a base pressure of less than 1E-4 mbar,
providing a substrate temperature above 50° C.,
providing a process pressure of less than 1E-1 mbar by providing a protective atmosphere to a process chamber of an instrument grade argon gas prior to the deposition of the adhesion layer by a vacuum deposition process, and
performing the vacuum deposition process using at least one reactive gas selected from the group consisting of: instrument grade oxygen, instrument grade nitrogen and using a partial pressure of the at least one reactive gas of 1E-6 to 5E-4 mbar.

18. The method according to claim 15, wherein the anti-reflection stack is deposited onto the absorber stack by:
providing a base pressure of less than 1E-4 mbar, providing a substrate temperature above 50 C,
providing a process pressure of less than 1E-1 mbar by providing a protective atmosphere to a process chamber of an instrument grade argon gas prior to the deposition of the adhesion layer by a vacuum deposition process, and
performing the vacuum deposition process using at least one reactive gas selected from the group consisting of: instrument grade oxygen, instrument grade nitrogen and using a partial pressure of the at least one reactive gas of 1E-6 to 5E-4 mbar.

19. A method for making a solar selective coating configured to be deposited on a substrate for a vacuum deposition process, comprising:
ion etching of a surface of the substrate with an ion gun using a process pressure in the range of 1E-5 bar to 5E-2 bar, and argon gas as an ionization gas;
providing a temperature of above 100° C. to the substrate;
sputtering for a deposition of an adhesion layer including a metallic layer that includes molybdenum and titanium using a process pressure in the range of 1E-3 bar to 1E-2 bar, and argon as a sputtering gas;
sputtering for a deposition of a titanium aluminium nitride layer using a process pressure in the range of 1E-3 to bar 1E-2 bar, argon as the sputtering gas, and nitrogen as a reactive gas using a partial pressure of the reactive gas in the range of 1E-6 to 5E-4 mbar; and
sputtering for a deposition of at least one silicon nitride layer using a process pressure in the range of 1E-3 bar to 1E-2 bar, argon as the sputtering gas, and nitrogen as the reactive gas using a partial pressure of the reactive gas in the range of 1E-6 to 5E-4 mbar wherein: the solar selective coating further including (a) an absorber stack including at least one absorber layer, and (b) an anti-reflection stack comprising at least one antireflection layer, wherein the adhesion layer, the absorber stack and the antireflection stack are provided in a sandwich construction in which the adhesion layer is deposited on the substrate, the adhesion layer has a 110-130 nm thickness, the adhesion layer including a metallic layer with 85-99% (w/w) Mo and 1-15% (w/w) Ti, the absorber stack configured with a single absorber layer including a 110-130 nm titanium aluminium nitride layer, and the antireflection stack configured with a single antireflection layer including at least one 50-70 nm silicon nitride layer.

20. A method for making a solar selective coating configured to be deposited on a substrate for a vacuum deposition process, comprising:
ion etching of a surface of the substrate with an ion gun using a process pressure in the range of 1E-5 bar to 5E-2 bar, and argon gas as an ionization gas;
providing a temperature of above 100° C. to the substrate;
sputtering for a deposition of an adhesion layer including a metallic layer that includes molybdenum and titanium using a process pressure in the range of 1E-3 bar to 1E-2 bar, and argon as a sputtering gas;
sputtering for a deposition of a titanium aluminium nitride layer using a process pressure in the range of 1E-3 to bar 1E-2 bar, argon as the sputtering gas, and nitrogen as a reactive gas using a partial pressure of the reactive gas in the range of 1E-6 to 5E-4 mbar; and
sputtering for a deposition of at least one silicon nitride layer using a process pressure in the range of 1E-3 bar to 1E-2 bar, argon as the sputtering gas, and nitrogen as the reactive gas using a partial pressure of the reactive gas in the range of 1E-6 to 5E-4 mbar wherein: the solar selective coating further including (a) an absorber stack including at least one absorber layer, and (b) an antireflection stack including at least one antireflection layer, wherein the adhesion layer, the absorber stack and the antireflection stack are provided in a sandwich construction in which the adhesion layer is deposited on the substrate, the adhesion layer includes a 110-130 nm thickness, the adhesion layer including a metallic layer with 85-99% (w/w) Mo and 1-15% (w/w) Ti, the absorber stack is configured with a single absorber layer including a 60-80 nm titanium aluminium nitride layer, and a single semi-absorber layer including a 20-40 nm titanium aluminium oxynitride layer, and the antireflection stack is configured with a single antireflection layer including at least one 70-90 nm silicon oxide layer.

21. A process for providing a solar absorber by depositing a solar selective coating via a vacuum deposition process onto a thermal absorber configuration, comprising:
providing a pre-polished substrate; preparing a surface of the substrate by ion-etching;
depositing an adhesion layer onto the substrate surface;
depositing an absorber stack onto the adhesion layer one layer at a time; and depositing an antireflection stack onto the absorber stack one layer at a time, wherein the adhesion layer includes a metallic layer including a refractory metal and a dope-material, the dope-material including a metal or metalloid, the metallic layer being configured with an amorphous disordered structure; and
wherein the metallic layer includes molybdenum as refractory metal and titanium as dope-material.

* * * * *